(12) United States Patent
Shen

(10) Patent No.: US 10,959,049 B2
(45) Date of Patent: Mar. 23, 2021

(54) SCENE SHARING-BASED NAVIGATION ASSISTANCE METHOD AND TERMINAL

(71) Applicant: HUAWEI TECHNOLOGIES CO., LTD., Guangdong (CN)

(72) Inventor: Huihai Shen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 15/923,415

(22) Filed: Mar. 16, 2018

(65) Prior Publication Data
US 2018/0213358 A1 Jul. 26, 2018

Related U.S. Application Data

(63) Continuation of application No. PCT/CN2016/111558, filed on Dec. 22, 2016.

(30) Foreign Application Priority Data

Jan. 28, 2016 (CN) .......................... 201610058850.6

(51) Int. Cl.
*H04W 4/02* (2018.01)
*H04W 4/024* (2018.01)
(Continued)

(52) U.S. Cl.
CPC ............ *H04W 4/024* (2018.02); *G01C 21/20* (2013.01); *G01S 19/10* (2013.01); *H04N 7/185* (2013.01); *H04W 4/025* (2013.01); *G01S 19/42* (2013.01)

(58) Field of Classification Search
CPC ....... H04W 4/024; H04W 4/025; H04W 4/02; H04N 7/185; G01C 21/20; G01S 19/42; G01S 19/10
See application file for complete search history.

(56) References Cited

U.S. PATENT DOCUMENTS 9,244,940 B1 1/2016 Donsbach et al.
9,625,267 B2 * 4/2017 Jung .................... G01C 21/362
(Continued)

FOREIGN PATENT DOCUMENTS

CN 102440011 A 5/2012
CN 102607579 7/2012
(Continued)

OTHER PUBLICATIONS

Korean Office Action dated Feb. 26, 2019 in corresponding Korean Patent Application No. 2018-7008449 (14 pages).
(Continued)

*Primary Examiner* — Michael V Kerrigan
(74) *Attorney, Agent, or Firm* — Fish & Richardson P.C.

(57) ABSTRACT

A scene sharing-based navigation assistance method and terminal is disclosed. A first terminal shares a scene image screen of a current scene of the first terminal with a second terminal, the first terminal receives prompt information sent by the second terminal, and the first terminal displays, on the scene image screen, the prompt information used to indicate a position of a target point. In this way, a user of the first terminal can more accurately describe, by using the scene image screen, a scene in which the user is located, so that the second terminal can more accurately determine the prompt information.

19 Claims, 22 Drawing Sheets

A first terminal shares a scene image screen of a current scene of the first terminal with a second terminal ⸺ 201

The first terminal receives prompt information sent by the second terminal ⸺ 202

The first terminal displays the prompt information on the scene image screen ⸺ 203

(51) Int. Cl.
  *G01C 21/20* (2006.01)
  *G01S 19/10* (2010.01)
  *H04N 7/18* (2006.01)
  *G01S 19/42* (2010.01)

(56) References Cited

U.S. PATENT DOCUMENTS

| | | |
|---|---|---|
| 2010/0211901 A1 | 8/2010 | Nezu et al. |
| 2012/0033032 A1 | 2/2012 | Kankainen |
| 2013/0113623 A1 | 5/2013 | Park et al. |
| 2013/0130726 A1 | 5/2013 | Deng et al. |
| 2013/0134730 A1* | 5/2013 | Ricci ............ H04W 4/90 296/24.34 |
| 2014/0240440 A1 | 8/2014 | Seo et al. |
| 2014/0297178 A1 | 10/2014 | Luan et al. |
| 2018/0356247 A1 | 12/2018 | Jung et al. |

FOREIGN PATENT DOCUMENTS

| | | |
|---|---|---|
| CN | 102801653 | 11/2012 |
| CN | 103002244 A | 3/2013 |
| CN | 103185583 | 7/2013 |
| CN | 103347046 A | 10/2013 |
| CN | 103383262 A | 11/2013 |
| CN | 103968822 A | 8/2014 |
| CN | 104297763 | 1/2015 |
| CN | 104539667 | 4/2015 |
| CN | 104613971 | 5/2015 |
| CN | 104618854 A | 5/2015 |
| JP | 2014-170524 A | 9/2014 |
| KR | 10-1143249 B1 | 5/2012 |
| KR | 10-2013-0062399 A | 6/2013 |
| KR | 10-2015-0020850 A | 2/2015 |

OTHER PUBLICATIONS

International Search Report dated Mar. 22, 2017 in corresponding International Patent Application No. PCT/CN2016/111558.
Office Action, dated Mar. 15, 2019, in Chinese Application No. 201610058850.6 (12 pp.).
International Search Report, dated Mar. 22, 2017, in International Application No. PCT/CN2016/111558 (5 pp.).
Written Opinion of the International Searching Authority, dated Mar. 22, 2017, in International Application No. PCT/CN2016/111558 (8 pp.).
Examination Report issued in Indian Application No. 201837008258 dated Mar. 18, 2020, 6 pages.
Office Action issued in Chinese Application No. 201610058850.6 dated Jun. 2, 2020, 11 pages.

* cited by examiner

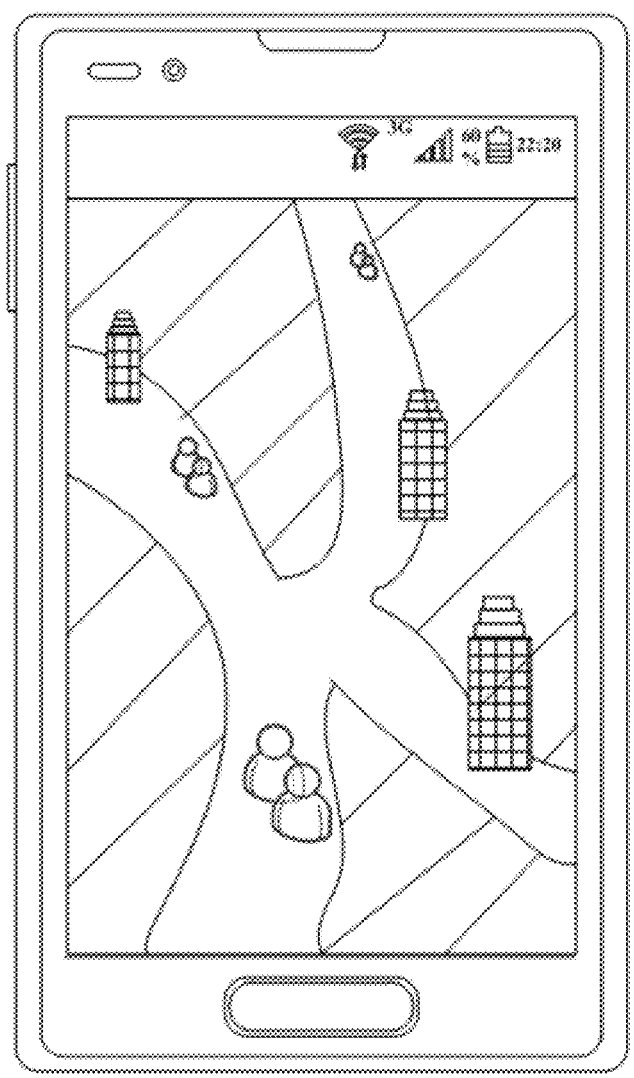
 Building
 People
 Lawn
FIG. 2c

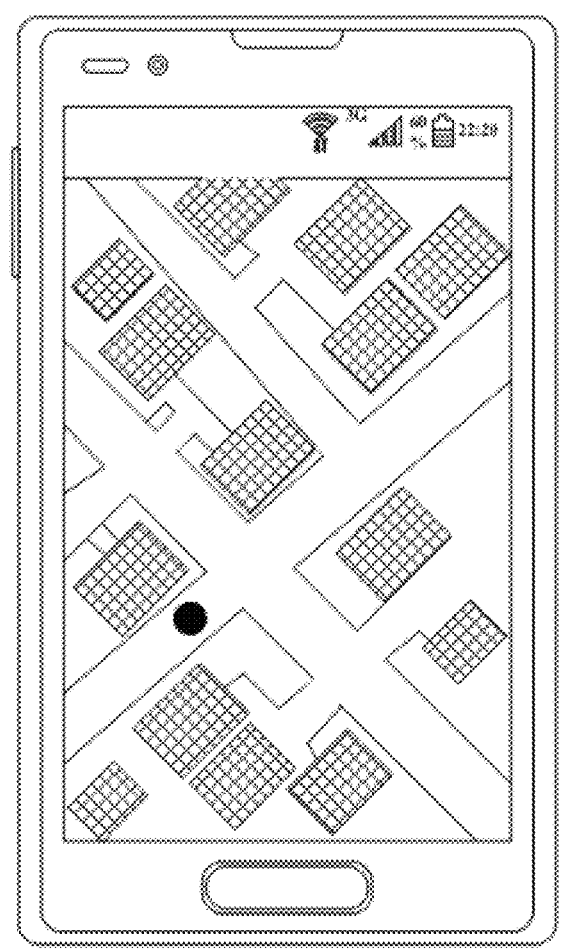
 Building
 Position of a first terminal on a GPS map interface
FIG. 2d

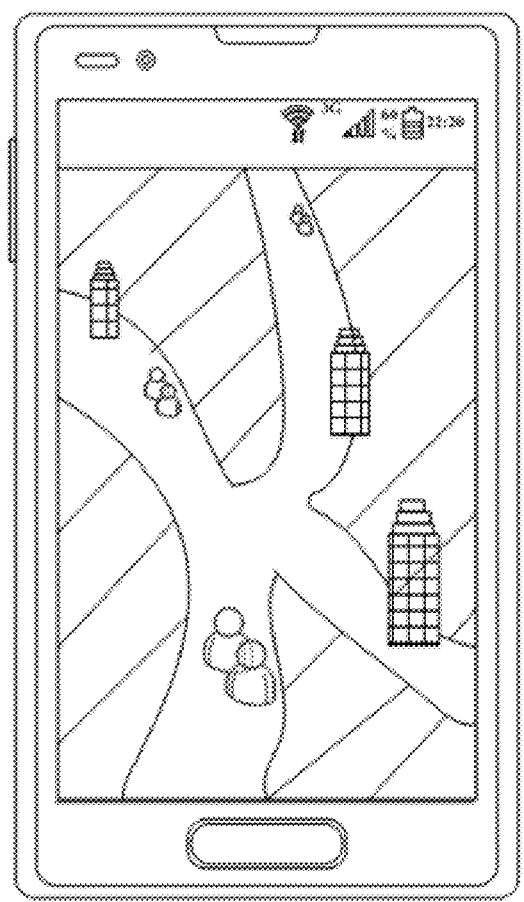
 Building
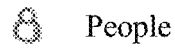 People
 Lawn
FIG. 2i

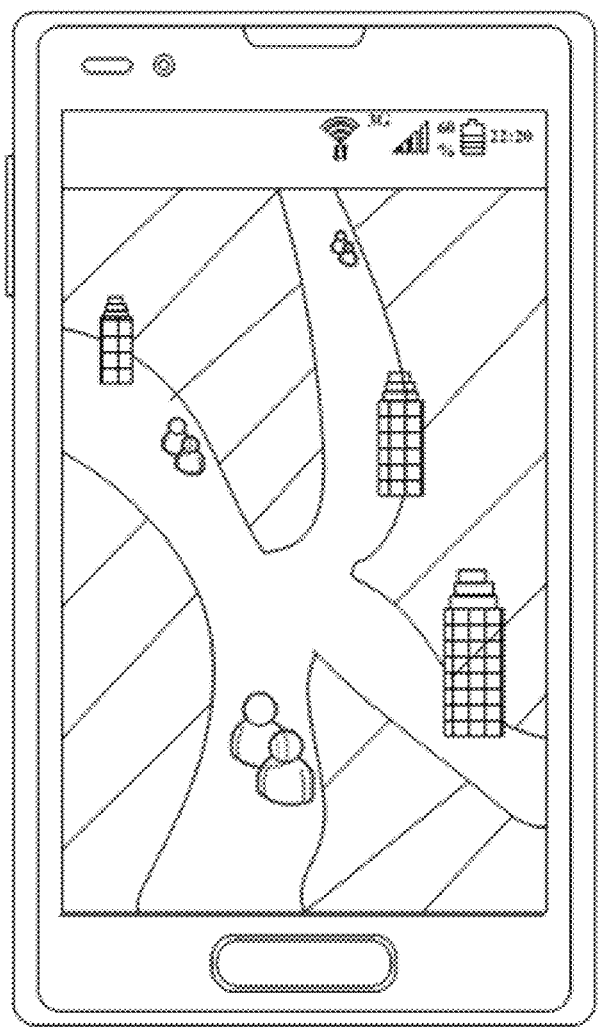
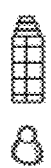 Building
 People
 Lawn
FIG. 2j

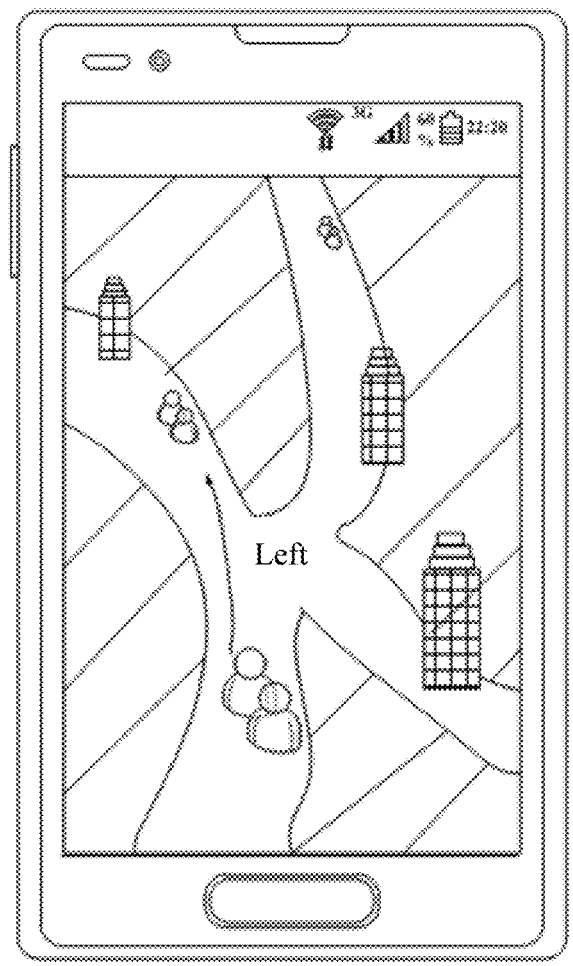
 Building
 People
 Lawn
FIG. 2k

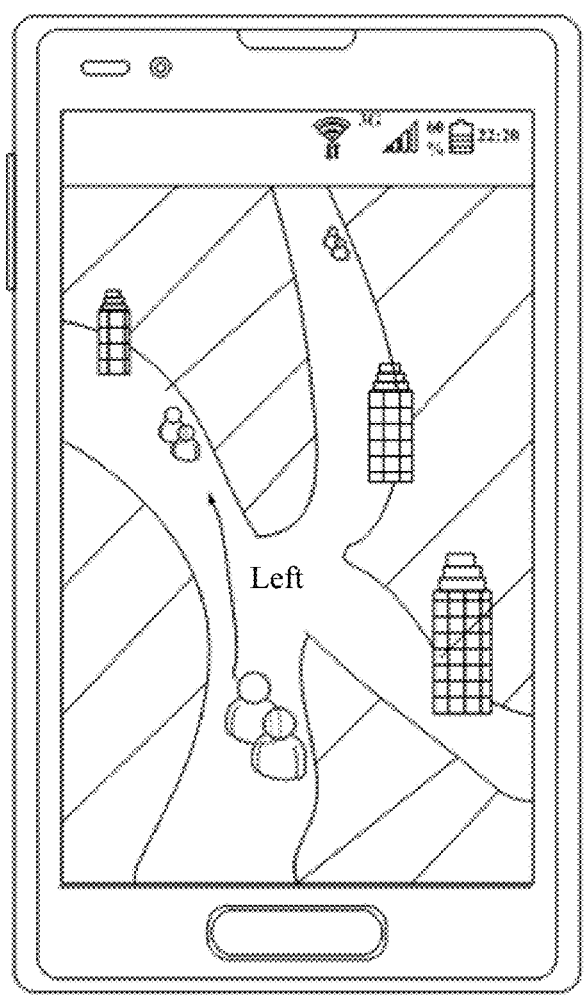
 Building
 People
 Lawn
FIG. 21

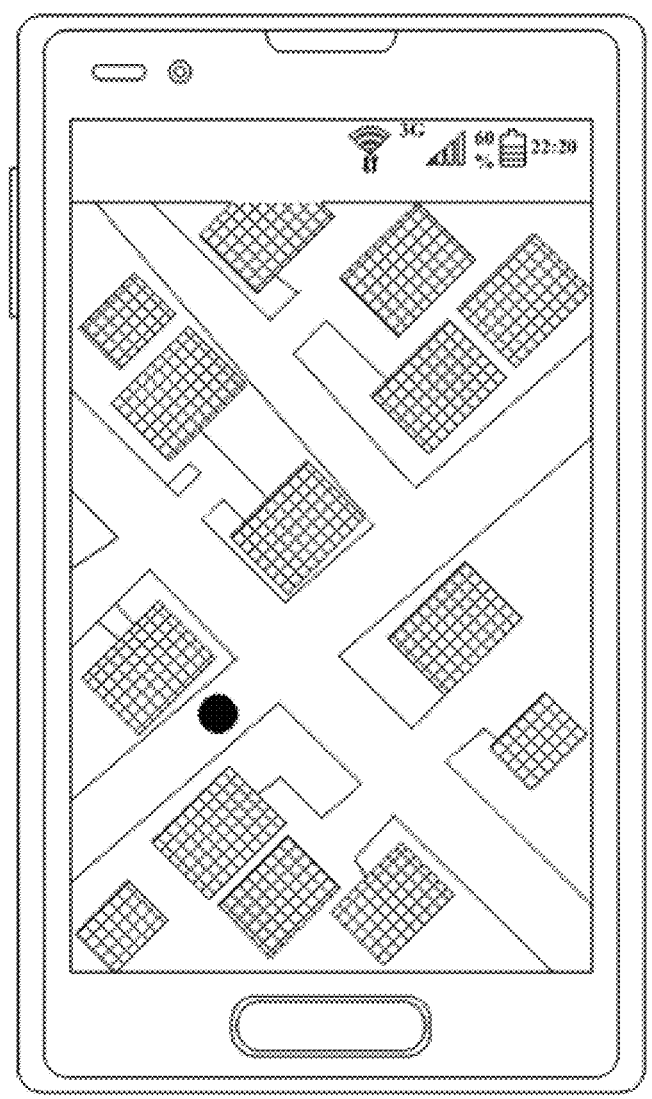
Building 
 Position of a first terminal on a GPS map interface
FIG. 2m Building Position of a first terminal on a GPS map interface

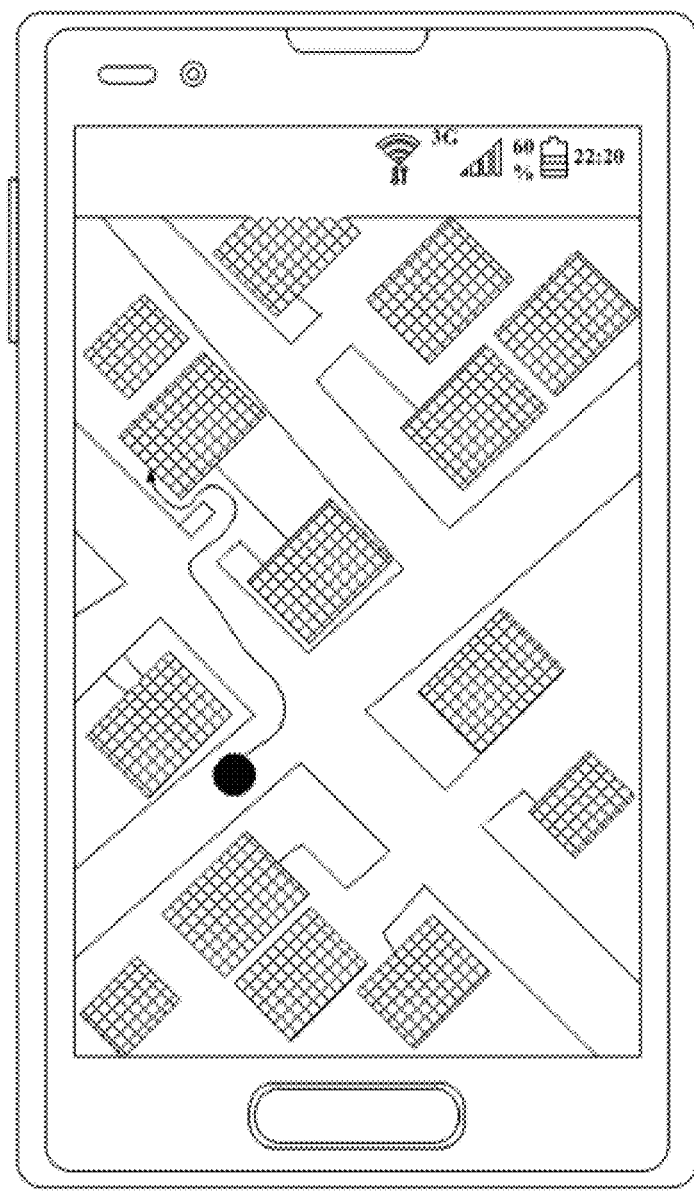
 Building
 Position of a first terminal on a GPS map interface
FIG. 2o

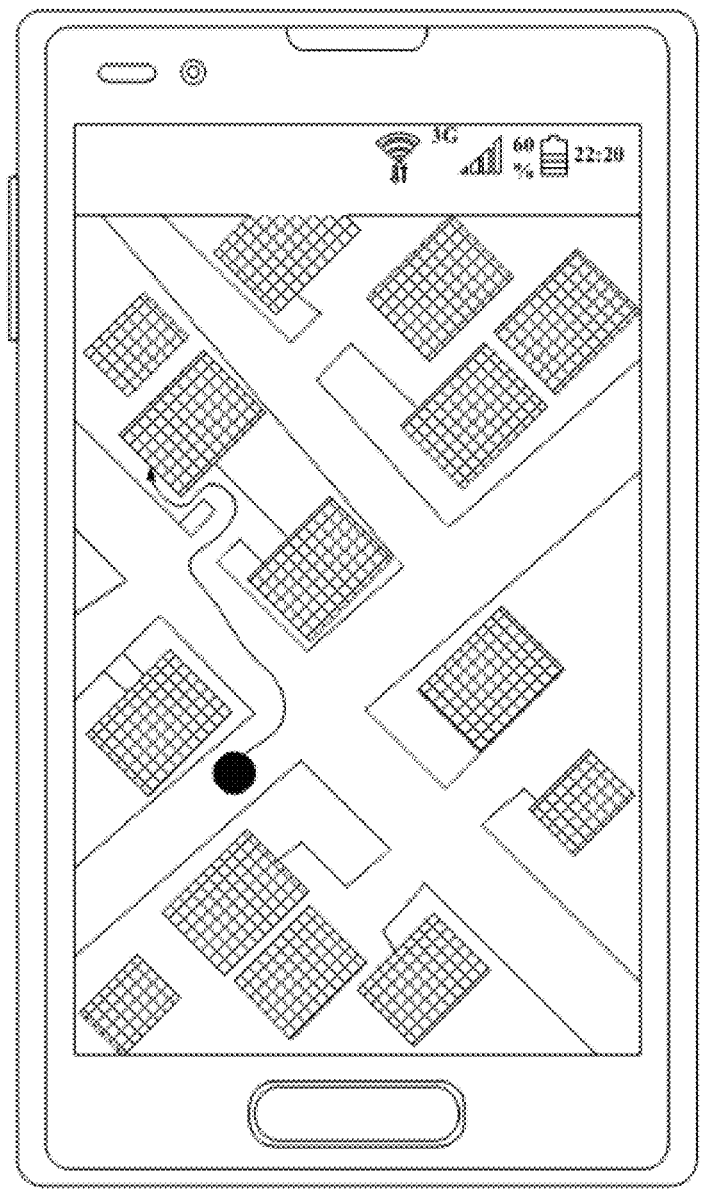
 Building
 Position of a first terminal on a GPS map interface
FIG. 2p

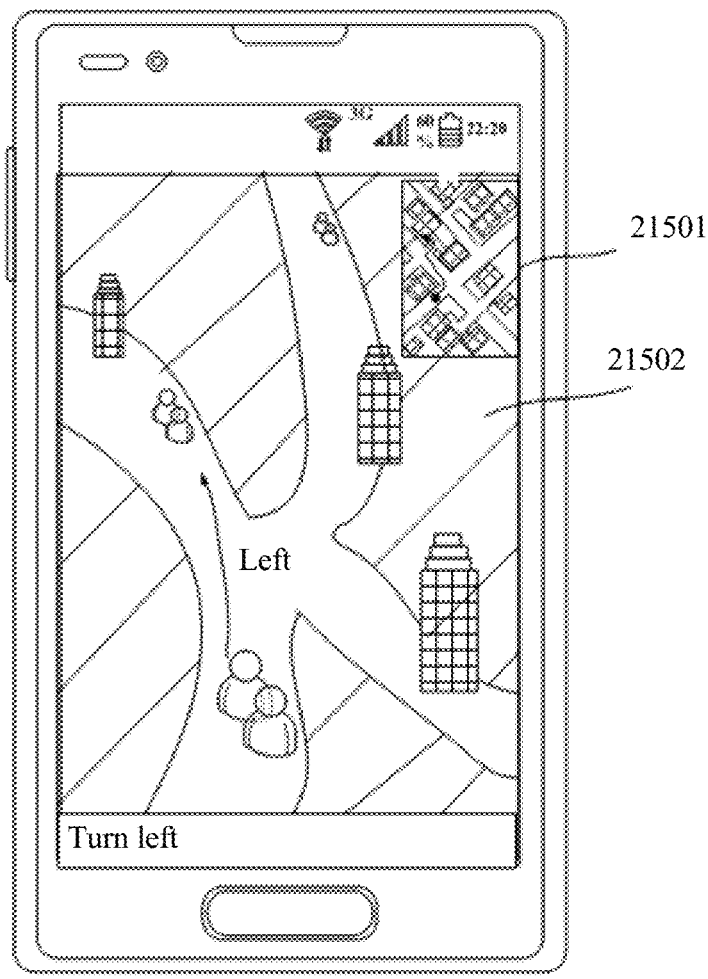
 Building
 People
 Lawn
 Building
 Position of a first terminal on a GPS map interface
FIG. 2q

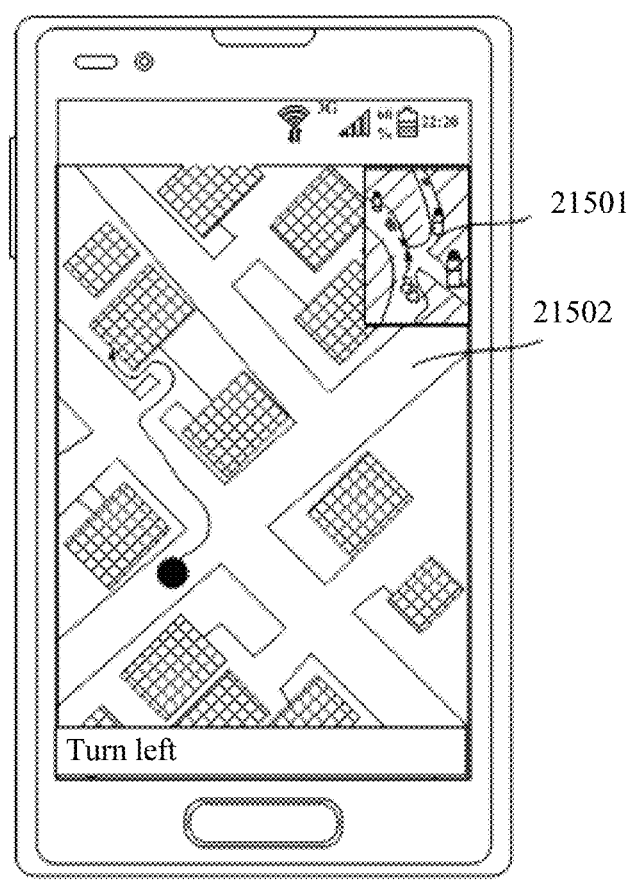
 Building
 People
 Lawn
 Building
 Position of a first terminal on a GPS map interface
FIG. 2r

SCENE SHARING-BASED NAVIGATION ASSISTANCE METHOD AND TERMINAL

CROSS-REFERENCE TO RELATED APPLICATIONS

This application is a continuation of International Application No. PCT/CN2016/111558, filed on Dec. 22, 2016, which claims priority to Chinese Patent Application No. 201610058850.6, filed on Jan. 28, 2016. The disclosures of the aforementioned applications are hereby incorporated by reference in their entireties.

TECHNICAL FIELD

Embodiments of the present application relate to the communications field, and in particular, to a scene sharing-based navigation assistance method and terminal.

BACKGROUND

A main objective of a Global Positioning System (GPS) is to provide a real-time, all-weather, and global navigation service for land, sea, and air fields, and is used for some military objectives such as intelligence collection, nuclear explosion monitoring, or emergency communication. After more than 20 years of research and experiment, and with 30 billion dollars of costs, a constellation that includes 24 GPS satellites with a global coverage rate up to 98% has been laid by 1994. Currently, in the GPS, functions such as vehicle positioning, antitheft, anti-robbing, travelling route monitoring, and call commanding may be provided for a user by using a terminal positioning system. The terminal positioning system is a technology or a service in which position information (longitude and latitude coordinates) of a mobile phone or a terminal way seeker is obtained by using a specific positioning technology, and a position of a positioned object is marked on an electronic map.

When a help seeker wants to reach a target point, the help seeker usually describes a scene in which the help seeker is currently located for an assistant in language, and expects that the assistant shows a way for the help seeker. However, the help seeker cannot efficiently and accurately describe the scene in which the help seeker is currently located for the assistant in language. Consequently, the assistant cannot give prompt information used for helping the help seeker reach the target point, or the assistant gives wrong prompt information.

In conclusion, there is an urgent need for a scene sharing-based navigation assistance method and terminal, so that the help seeker can more accurately describe, in a simple manner, the scene in which the help seeker is located, and the assistant can give more accurate prompt information used for helping the help seeker reach the target point.

SUMMARY

Embodiments of the present application provide a scene sharing-based navigation assistance method and terminal, so that a help seeker can more accurately describe, in a simple manner, a scene in which the help seeker is located, and an assistant can give more accurate prompt information used for helping the help seeker reach a target point.

According to a first aspect, an embodiment of the present application provides a scene sharing-based navigation assistance method, including: sharing, by a first terminal, a scene image screen of a current scene of the first terminal with a second terminal; receiving, by the first terminal, prompt information sent by the second terminal; and displaying, by the first terminal, the prompt information on the scene image screen, where the prompt information is used to indicate a position of a target point to be found by the first terminal or indicate a specific path to the target point, and the prompt information is determined by the second terminal according to the shared scene image screen and the target point. Because the first terminal shares the scene image screen of the current scene of the first terminal with the second terminal, a user of the first terminal can more accurately describe, by using the scene image screen, a scene in which the user is located, and the second terminal can more accurately determine the prompt information according to the shared scene image screen and received help request information. Further, because the first terminal displays the prompt information on the scene image screen, the user of the first terminal can more easily and accurately determine a meaning of the prompt information, and more quickly and conveniently find the target point according to the prompt information.

Optionally, before the receiving, by the first terminal, prompt information sent by the second terminal, the method further includes: sending, by the first terminal, help request information to the second terminal, where the help request information includes information about the target point to be found by the first terminal. Specifically, after the first terminal shares the scene image screen of the current scene of the first terminal with the second terminal, the first terminal sends the help request information to the second terminal. Alternatively, the first terminal sends the help request information to the second terminal, and then, the first terminal shares the scene image screen of the current scene of the first terminal with the second terminal.

In another implementation, the first terminal shares the scene image screen of the current scene of the first terminal with the second terminal, and the second terminal delivers a task requirement to the first terminal according to a need of the second terminal. That is, the second terminal generates the prompt information based on the shared scene image screen of the current scene of the first terminal, and sends the prompt information to the first terminal.

Optionally, the scene image screen includes: an image screen or a video screen obtained by shooting the current scene of the first terminal by a camera device connected to the first terminal, and/or a GPS map screen that includes a position of the current scene of the first terminal.

Optionally, the prompt information includes at least one piece of the following information: mark information used to indicate the position of the target point or indicate the specific path to the target point, text information used to indicate the position of the target point or indicate the specific path to the target point, or audio information used to indicate the position of the target point or indicate the specific path to the target point.

Optionally, when the prompt information is the mark information used to indicate the position of the target point or indicate the specific path to the target point, the method further includes: receiving, by the first terminal, position information that is of the mark information on the scene image screen and sent by the second terminal; and the displaying, by the first terminal, the prompt information on the scene image screen includes: displaying, by the first terminal according to the received position information, the mark information in a corresponding position on the scene image screen displayed by the first terminal. In this way, in one aspect, the second terminal can more conveniently add the prompt information to the scene image screen. In another aspect, the user of the first terminal can more easily understand a meaning of the prompt information added by the second terminal.

Optionally, after the displaying, by the first terminal according to the received position information, the mark information in a corresponding position on the scene image screen displayed by the first terminal, the method further includes: obtaining, by the first terminal, first movement data of movement of the camera device connected to the first terminal; converting, by the first terminal, the first movement data into second movement data of movement of the mark information; and moving, by the first terminal according to the second movement data obtained after the conversion, the mark information displayed on the scene image screen, so that the moved mark information matches a scene image screen shot by the moved camera device. In this way, accuracy of the prompt information can be ensured, and inaccuracy of the prompt information caused by movement of the prompt information is avoided.

Optionally, the displaying, by the first terminal, the mark information in a corresponding position on the scene image screen displayed by the first terminal includes: displaying, by the first terminal, the mark information in a corresponding position at a layer that is parallel to a display plane of the scene image screen.

Optionally, the obtaining, by the first terminal, first movement data of movement of the camera device connected to the first terminal includes: obtaining, by the first terminal by using an acceleration sensor and a gyro sensor, the first movement data of the movement of the camera device connected to the first terminal. In this way, the prompt information can movement with the first terminal by using a simple method.

Optionally, the mark information is any one of or any combination of the following marks: curve mark information, straight line mark information, arrow line mark information, or closed graph mark information.

Optionally, when the scene image screen includes both the image screen or the video screen obtained by shooting the current scene of the first terminal by the camera device connected to the first terminal, and the GPS map screen that includes the position of the current scene of the first terminal, a display screen for displaying the scene image screen by the first terminal includes a first area and a second area. The first area is used to display the image screen or the video screen obtained by shooting the current scene of the first terminal by the camera device connected to the first terminal, and the second area is used to display the GPS map screen that includes the position of the current scene of the first terminal or display no content. Alternatively, the first area is used to display the GPS map screen that includes the position of the current scene of the first terminal, and the second area is used to display the image screen or the video screen obtained by shooting the current scene of the first terminal by the camera device connected to the first terminal or display no content.

Optionally, the method further includes: when the displayed scene image screen is touched, switching, by the first terminal, content displayed in the first area and content displayed in the second area.

Optionally, before the sharing, by a first terminal, a scene image screen of a current scene of the first terminal with a second terminal, the method further includes: sending, by the first terminal, a help request to the second terminal; and receiving, by the first terminal, a help request acceptance response returned by the second terminal, where the help request acceptance response is used to establish an screen sharing connection between the first terminal and the second terminal.

Optionally, after the displaying, by the first terminal, the prompt information on the scene image screen, the method further includes: receiving, by the first terminal, updated prompt information sent by the second terminal; and updating, by the first terminal by using the updated prompt information, the prompt information displayed on the scene image screen, where the updated prompt information is obtained by modifying the prompt information displayed on the scene image screen. In this way, the first terminal may continuously receive prompt information. For example, when the first terminal is currently at a crossroad, the second terminal sends prompt information, to instruct the first terminal to turn left. If the first terminal comes to another crossroad after turning left, the second terminal sends prompt information to the first terminal again, to instruct the first terminal to turn right, and then, the first terminal turns right. It may be learned that, in this embodiment of the present application, the second terminal may send prompt information to the first terminal multiple times, or may update the prompt information in real time, so as to provide more accurate prompt information for the first terminal.

According to a second aspect, an embodiment of the present application provides a scene sharing-based navigation assistance method, including: receiving, by a second terminal, a scene image screen that is shared by a first terminal and that is of a current scene of the first terminal; determining, by the second terminal according to the shared scene image screen, prompt information used to indicate a position of a target point to be found by the first terminal or indicate a specific path to the target point; and sending, by the second terminal, the prompt information to the first terminal, so that the first terminal displays the prompt information on the scene image screen. Because the first terminal shares the scene image screen of the current scene of the first terminal with the second terminal, a user of the first terminal can more accurately describe, by using the scene image screen, a scene in which the user is located, and the second terminal can more accurately determine the prompt information according to the shared scene image screen and received help request information. Further, because the first terminal displays the prompt information on the scene image screen, the user of the first terminal can more easily and accurately determine a meaning of the prompt information, and more quickly and conveniently find the target point according to the prompt information.

Optionally, before the determining, by the second terminal according to the shared scene image screen, prompt information used to indicate a position of a target point to be found by the first terminal or indicate a specific path to the target point, the method further includes: receiving, by the second terminal, help request information sent by the first terminal, where the help request information includes information about the target point to be found by the first terminal. The determining, by the second terminal according to the shared scene image screen, prompt information used to indicate a position of a target point to be found by the first terminal or indicate a specific path to the target point specifically includes: determining, by the second terminal according to the shared scene image screen and the information about the target point in the help request information, the prompt information used to indicate the position of the target point to be found by the first terminal or indicate the specific path to the target point.

Specifically, after the first terminal shares the scene image screen of the current scene of the first terminal with the second terminal, the first terminal sends the help request information to the second terminal. Alternatively, the first terminal sends the help request information to the second terminal, and then, the first terminal shares the scene image screen of the current scene of the first terminal with the second terminal. In another implementation, the first terminal shares the scene image screen of the current scene of the first terminal with the second terminal, and the second terminal delivers a task requirement to the first terminal according to a need of the second terminal. That is, the second terminal generates the prompt information based on the shared scene image screen of the current scene of the first terminal, and sends the prompt information to the first terminal.

Optionally, the scene image screen includes: an image screen or a video screen obtained by shooting the current scene of the first terminal by a camera device connected to the first terminal, and/or a GPS map screen that includes a position of the current scene of the first terminal.

Optionally, the prompt information includes at least one piece of the following information: mark information used to indicate the position of the target point or indicate the specific path to the target point, text information used to indicate the position of the target point or indicate the specific path to the target point, or audio information used to indicate the position of the target point or indicate the specific path to the target point.

Optionally, when the prompt information is the mark information used to indicate the position of the target point or indicate the specific path to the target point, the method further includes: sending, by the second terminal, position information of the mark information on the scene image screen to the first terminal, where the position information is used to enable the first terminal to display, according to the received position information, the mark information in a corresponding position on the scene image screen displayed by the first terminal. In this way, in one aspect, the second terminal can more conveniently add the prompt information to the scene image screen. In another aspect, the user of the first terminal can more easily understand a meaning of the prompt information added by the second terminal.

Optionally, the scene image screen is the video screen obtained by shooting the current scene of the first terminal by the camera device connected to the first terminal. The determining, by the second terminal according to the shared scene image screen, prompt information used to indicate a position of a target point to be found by the first terminal or indicate a specific path to the target point includes: when receiving a first operation instruction, locking, as a static picture by the second terminal, the video screen displayed by the second terminal; displaying, by the second terminal on the static picture, a received touch track used to indicate the position of the target point to be found by the first terminal or indicate the specific path to the target point; and setting, by the second terminal, the touch track as the mark information, and/or generating text information of the specific path according to the touch track, and restoring the locked static picture to the video screen shared by the first terminal.

Optionally, the first operation instruction is double tapping or single tapping the video screen displayed by the second terminal.

Optionally, after the sending, by the second terminal, position information of the mark information on the scene image screen to the first terminal, the method further includes: obtaining, by the second terminal, first movement data of movement of the camera device connected to the first terminal; converting, by the second terminal, the first movement data into second movement data of movement of the mark information; and moving, by the second terminal according to the second movement data obtained after the conversion, the mark information displayed on the scene image screen, so that the moved mark information matches a scene image screen shot by the moved camera device. In this way, accuracy of the prompt information can be ensured, and inaccuracy of the prompt information caused by movement of the prompt information is avoided.

Optionally, after the determining, by the second terminal, prompt information used to indicate a position of a target point to be found by the first terminal or indicate a specific path to the target point, the method further includes: displaying, by the second terminal, the mark information at a layer that is parallel to a display plane of the scene image screen. Optionally, the first movement data is data obtained by the first terminal by using an acceleration sensor and a gyro sensor of the first terminal. In this way, the prompt information can movement with the first terminal by using a simple method.

Optionally, the mark information is any one of or any combination of the following marks: curve mark information, straight line mark information, arrow line mark information, or closed graph mark information. Optionally, when the scene image screen includes both the image screen or the video screen obtained by shooting the current scene of the first terminal by the camera device connected to the first terminal, and the GPS map screen that includes the position of the current scene of the first terminal, a display screen for displaying the scene image screen by the second terminal includes a first area and a second area. The first area is used to display the image screen or the video screen obtained by shooting the current scene of the first terminal by the camera device connected to the first terminal, and the second area is used to display the GPS map screen that includes the position of the current scene of the first terminal or display no content. Alternatively, the first area is used to display the GPS map screen that includes the position of the current scene of the first terminal, and the second area is used to display the image screen or the video screen obtained by shooting the current scene of the first terminal by the camera device connected to the first terminal or display no content.

Optionally, the method further includes: when the displayed scene image screen is touched, switching, by the second terminal, content displayed in the first area and content displayed in the second area.

Optionally, before the receiving, by a second terminal, a scene image screen that is shared by a first terminal and that is of a current scene of the first terminal, the method further includes: receiving, by the second terminal, a help request sent by the first terminal; and sending, by the second terminal, a help request acceptance response to the first terminal, where the help request acceptance response is used to establish a screen sharing connection between the first terminal and the second terminal.

Optionally, after the sending, by the second terminal, the prompt information to the first terminal, the method further includes: modifying, by the second terminal, the prompt information, to obtain updated prompt information; and sending, by the second terminal, the updated prompt information to the first terminal, so that the first terminal updates, by using the updated prompt information, the prompt information displayed on the scene image screen. In this way, the first terminal may continuously receive prompt information. For example, when the first terminal is currently at a crossroad, the second terminal sends prompt information, to instruct the first terminal to turn left. If the first terminal comes to another crossroad after turning left, the second terminal sends prompt information to the first terminal again, to instruct the first terminal to turn right, and then, the first terminal turns right. It may be learned that, in this embodiment of the present application, the second terminal may send prompt information to the first terminal multiple times, or may update the prompt information in real time, so as to provide more accurate prompt information for the first terminal.

According to a third aspect, an embodiment of the present application provides a scene sharing-based navigation assistance terminal. The terminal is configured to implement the method in the first aspect, and includes corresponding function modules separately used to implement steps in the foregoing method.

According to a fourth aspect, an embodiment of the present application provides a scene sharing-based navigation assistance terminal, where the terminal is configured to implement the method in the second aspect, and includes corresponding function modules separately used to implement steps in the foregoing method.

According to a fifth aspect, an embodiment of the present application provides a scene sharing-based navigation assistance terminal, where the terminal includes a transmitter, a receiver, a memory, and a processor, the memory is configured to store an instruction, the processor is configured to: execute the instruction stored in the memory, and control the transmitter to send a signal and the receiver to receive a signal, and when the processor executes the instruction stored in the memory, the terminal is configured to perform the method in the first aspect.

According to a sixth aspect, an embodiment of the present application provides a scene sharing-based navigation assistance terminal, where the terminal includes a transmitter, a receiver, a memory, and a processor, the memory is configured to store an instruction, the processor is configured to: execute the instruction stored in the memory, and control the transmitter to send a signal and the receiver to receive a signal, and when the processor executes the instruction stored in the memory, the terminal is configured to perform the method in the second aspect.

In the embodiments of the present application, a first terminal shares a scene image screen of a current scene of the first terminal with a second terminal, the first terminal receives prompt information sent by the second terminal, and the first terminal displays the prompt information on the scene image screen. The prompt information is used to indicate a position of a target point to be found by the first terminal or indicate a specific path to the target point, and the prompt information is determined by the second terminal according to the shared scene image screen and the target point. Because the first terminal shares the scene image screen of the current scene of the first terminal with the second terminal, a user of the first terminal can more accurately describe, by using the scene image screen, a scene in which the user is located, and the second terminal can more accurately determine the prompt information according to the shared scene image screen and received help request information. Further, because the first terminal displays the prompt information on the scene image screen, the user of the first terminal can more easily and accurately determine a meaning of the prompt information, and more quickly and conveniently find the target point according to the prompt information.

BRIEF DESCRIPTION OF DRAWINGS

To describe the technical solutions in the embodiments of the present application more clearly, the following briefly describes the accompanying drawings required for describing the embodiments.

FIG. 2c is a schematic diagram of another scene image screen according to an embodiment of the present application;

FIG. 2d is a schematic diagram of another scene image screen according to an embodiment of the present application;

FIG. 2i is a schematic diagram of a display screen for displaying a scene image screen by a first terminal according to an embodiment of the present application;

FIG. 2j is a schematic diagram of a display screen for displaying a scene image screen by a second terminal according to an embodiment of the present application;

FIG. 2k is a schematic diagram of a display screen obtained after a second terminal generates prompt information in FIG. 2j according to an embodiment of the present application;

FIG. 2l is a schematic diagram of a display screen obtained after a first terminal receives prompt information according to an embodiment of the present application;

FIG. 2m is a schematic diagram of a display screen for displaying a scene image screen by a first terminal according to an embodiment of the present application;

FIG. 2o is a schematic diagram of a display screen obtained after a second terminal generates prompt information in FIG. 2n according to an embodiment of the present application;

FIG. 2p is a schematic diagram of a display screen obtained after a first terminal receives prompt information according to an embodiment of the present application;

FIG. 2q is a schematic diagram of a display screen according to an embodiment of the present application;

FIG. 2r is a schematic diagram of another display screen according to an embodiment of the present application;

DESCRIPTION OF EMBODIMENTS

To make the objectives, technical solutions, and advantages of the present application clearer and more comprehensible, the following further describes the present application in detail with reference to the accompanying drawings and embodiments. It should be understood that the specific embodiments described herein are merely used to explain the present application but are not intended to limit the present application.

Figure 1:
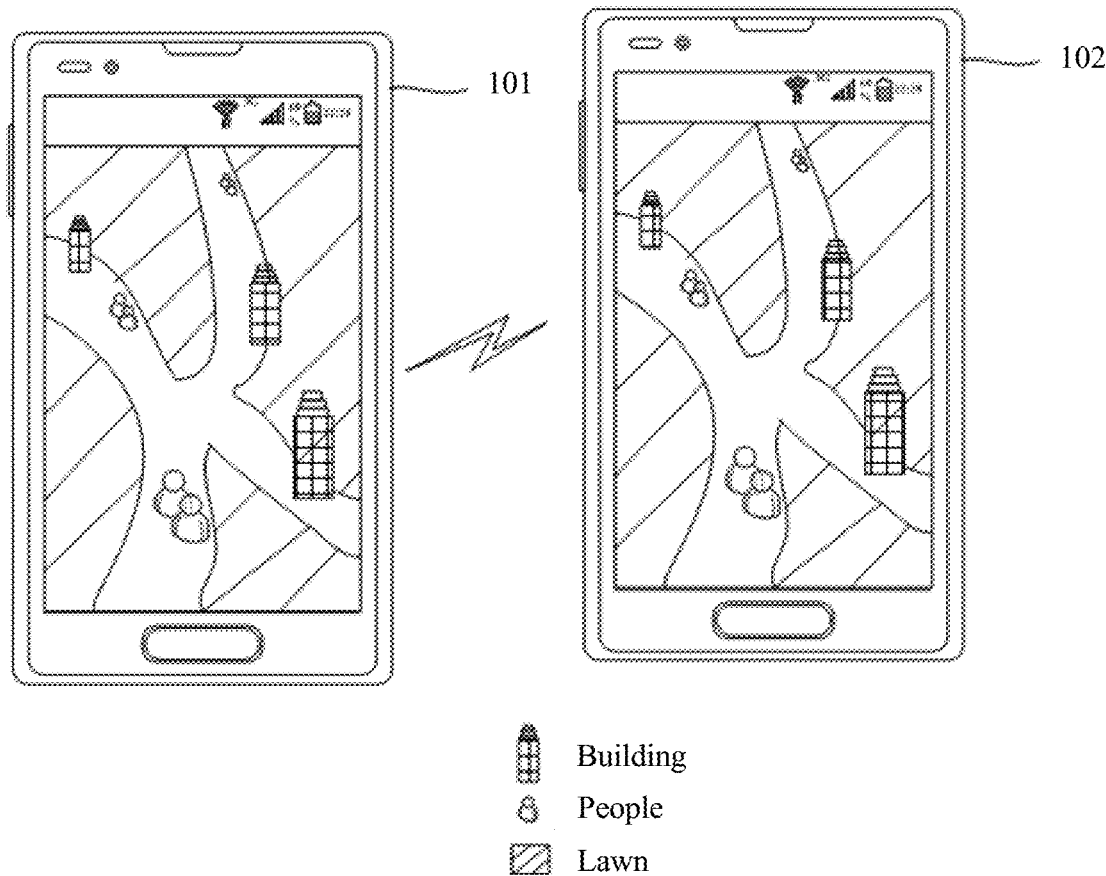
FIG. 1 is a schematic diagram of a system architecture applicable to an embodiment of the present application.

FIG. 1 is a schematic diagram of an example of a system architecture applicable to an embodiment of the present application. As shown in FIG. 1, the system architecture applicable to this embodiment of the present application includes a first terminal 101 and a second terminal 102. The first terminal 101 may be connected to the second terminal 102. On one hand, the first terminal 101 may share a scene image screen with the second terminal 102. On the other hand, the second terminal 102 may directly generate prompt information on the shared scene image screen, and send the prompt information to the first terminal 101. Optionally, the first terminal 101 and the second terminal 102 may mutually transmit real-time text information and/or audio information.

This embodiment of the present application is applicable to multiple scenarios, for example, a target point is a specific site, or may be a target object. A mall A is used as an example. In this case, the first terminal shares a scene image screen of a current scene of the first terminal with the second terminal, so that the second terminal can clearly and accurately determine a current position of the first terminal, and further indicate accurate prompt information for the first terminal. In this way, the first terminal reaches the mall A. In this case, the prompt information may indicate a specific path to the target point. The prompt information may be mark information. For example, an arrow line is drawn, to indicate the specific path to the target point or some objects on the specific path to the target point. For example, a circle is drawn on a landmark building, to indicate the specific path to the target point. For example, a crossroad is on the scene image screen, and there is a landmark building A on a path. In this case, the second terminal may draw a circle on the landmark building A, and the circle drawn on the landmark building A is mark information. The mark information may instruct the first terminal to take the path on which the landmark building A is located.

In another application scenario, for example, a target point is a to-be-maintained device of a maintenance staff. When reaching a site in which the to-be-maintained device is located, the first terminal finds that there are many such devices. In this case, the first terminal shares a scene image screen of a current scene of the first terminal with the second terminal, and the second terminal may accurately point out, based on the shared scene image screen, which device is the to-be-maintained device for the first terminal. That is, the prompt information sent to the first terminal by the second terminal may indicate a position of the target point. The prompt information may be mark information that indicates the position of the target point, for example, a circle drawn on the target point; the prompt information is text information such as a piece of text: "The second device on the scene image screen is the target point"; or the prompt information is audio information such as an audio file: "The second device on the scene image screen is the target point".

For another example, in another application scenario, the second terminal releases a task to the first terminal. For example, after the first terminal reaches a position in which the target point can be attacked, the second terminal sends prompt information to the first terminal by using the method provided in this embodiment of the present application. The prompt information may clearly indicate, for the first terminal, which target point is a target point to be attacked by the first terminal.

The "first" and the "second" of the first terminal and the second terminal in this embodiment of the present application are merely used for distinguishing between different terminals, and are not intended for limitation. In this embodiment of present application, the first terminal may be any terminal in all terminals, and the second terminal may be any terminal in all terminals. The terminal in the present application is a device that provides voice and/or data connectivity for a user, and includes a wireless terminal or a wired terminal. The wireless terminal may be a handheld device with a wireless connection function, another processing device connected to a wireless modem, or a mobile terminal that communicates with one or more core networks by using a radio access network. For example, the wireless terminal may be a mobile phone (or referred to as a "cellular" phone) or a computer with a mobile terminal. For another example, the wireless terminal may be a portable, pocket-sized, handheld, computer-built-in, or vehicle-mounted mobile apparatus. For another example, the wireless terminal may be a part of a mobile station, an access point, or user equipment (UE).

Figure 2:
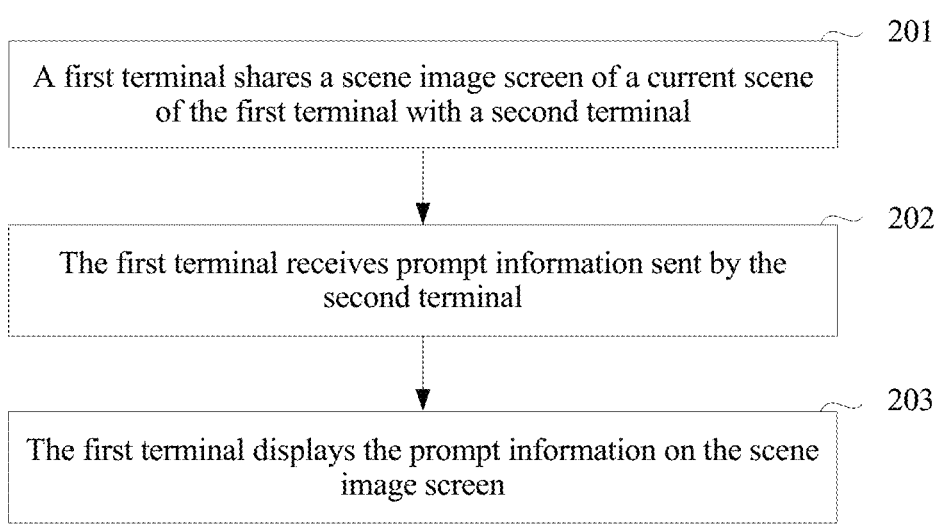
FIG. 2 is a schematic flowchart of a scene sharing-based navigation assistance method according to an embodiment of the present application.

FIG. 2 is a schematic flowchart of an example of a scene sharing-based navigation assistance method according to an embodiment of the present application.

As shown in FIG. 2, based on the system architecture shown in FIG. 1, the scene sharing-based navigation assistance method provided in this embodiment of the present application includes the following steps:

Step 201: A first terminal shares a scene image screen of a current scene of the first terminal with a second terminal.

Step 202: The first terminal receives prompt information sent by the second terminal.

Step 203: The first terminal displays the prompt information on the scene image screen, where the prompt information is used to indicate a position of a target point to be found by the first terminal or indicate a specific path to a target point, and the prompt information is determined by the second terminal according to the shared scene image screen and the target point.

Specifically, the prompt information may indicate the specific path to the target point. The prompt information may be mark information. For example, an arrow line is drawn, to indicate the specific path to the target point or some objects on the specific path to the target point. For example, a circle is drawn on a landmark building, to indicate the specific path to the target point. Alternatively, the prompt information may indicate the position of the target point. The prompt information may be mark information that indicates the position of the target point, for example, a circle drawn on the target point; the prompt information is text information such as a piece of text: "The second device on the scene image screen is the target point"; or the prompt information is audio information such as an audio file: "The second device on the scene image screen is the target point".

Figure 2A:
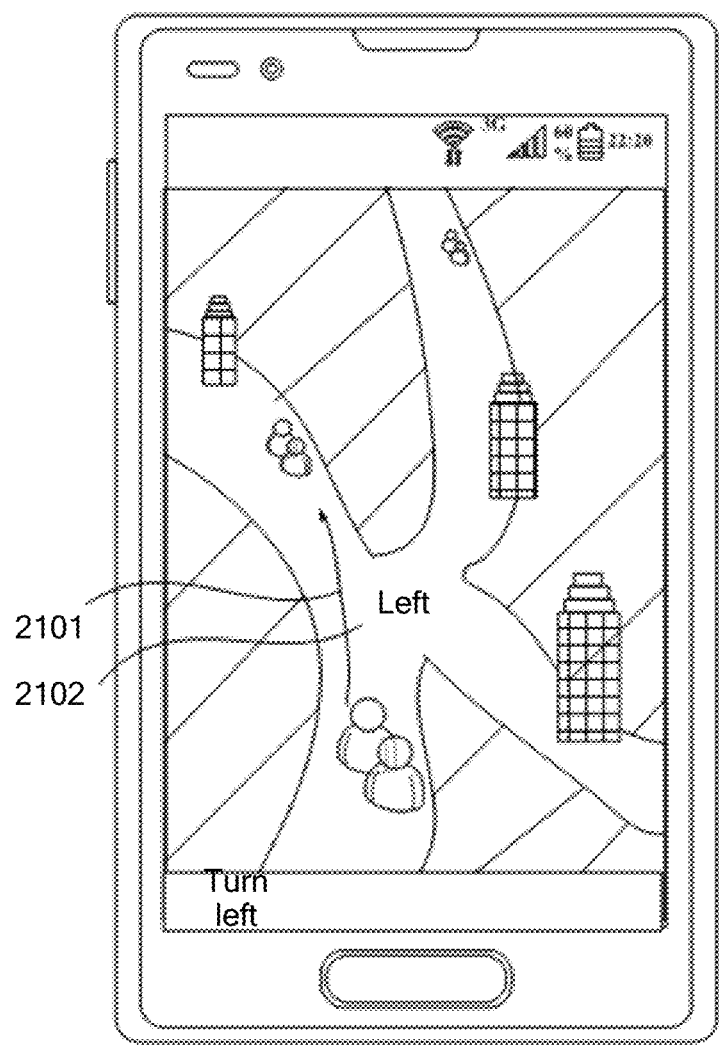
FIG. 2a is a schematic diagram of a scene image screen according to an embodiment of the present application.
Figure 2B:
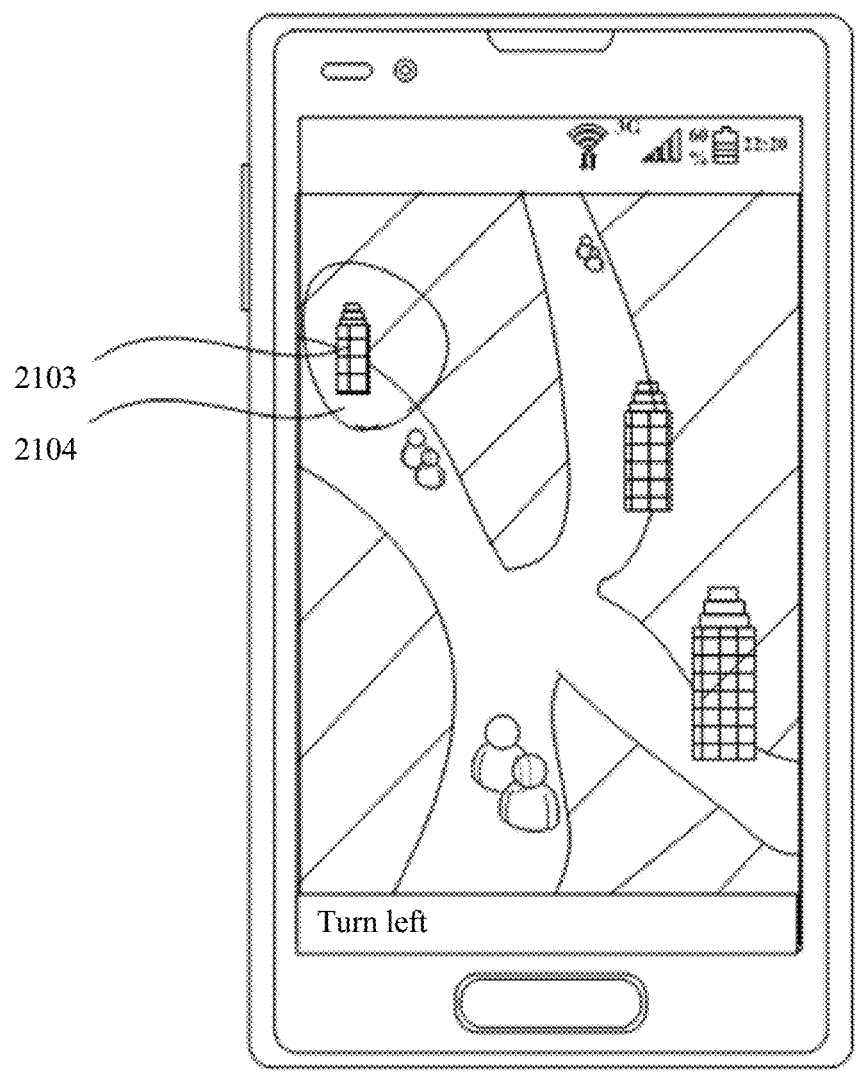
FIG. 2b is a schematic diagram of another scene image screen according to an embodiment of the present application.

FIG. 2a is a schematic diagram of an example of a scene image screen according to an embodiment of the present application. FIG. 2b is a schematic diagram of an example of another scene image screen according to an embodiment of the present application. As shown in FIG. 2a, the prompt information is information that indicates the specific path to the target point, for example, mark information 2101 and text information 2102. As shown in FIG. 2b, the prompt information is information that indicates the specific path to the target point. For example, in FIG. 2b, a circle 2104 is drawn on a building 2103 to indicate the specific path to the target point, that is, in FIG. 2b, the circle 2104 is drawn on the building 2103 to indicate that the specific path to the target point is a path to which the building 2103 belongs.

Optionally, before step 202, the first terminal sends help request information to the second terminal, and the help request information includes information about the target point to be found by the first terminal. Specifically, the information about the target point may be an identifier of the target point, for example, a commercial building A. Specifically, after the first terminal shares the scene image screen of the current scene of the first terminal with the second terminal, the first terminal sends the help request information to the second terminal. Alternatively, the first terminal sends the help request information to the second terminal, and then, the first terminal shares the scene image screen of the current scene of the first terminal with the second terminal.

In another implementation, the first terminal shares the scene image screen of the current scene of the first terminal with the second terminal, and the second terminal delivers a task requirement to the first terminal according to a need of the second terminal. That is, the second terminal generates the prompt information based on the shared scene image screen of the current scene of the first terminal, and sends the prompt information to the first terminal.

Correspondingly, in this embodiment of the present application, a second terminal receives a scene image screen that is shared by a first terminal and that is of a current scene of the first terminal. The second terminal determines, according to the shared scene image screen, prompt information used to indicate a position of a target point to be found by the first terminal or indicate a specific path to the target point. The second terminal sends the prompt information to the first terminal, so that the first terminal displays the prompt information on the scene image screen.

Optionally, before the second terminal determines, according to the shared scene image screen, the prompt information used to indicate the position of the target point to be found by the first terminal or indicate the specific path to the target point, the second terminal receives help request information sent by the first terminal, and the help request information includes information about the target point to be found by the first terminal. The second terminal determines, according to the scene image screen and the information about the target point in the help request information, the prompt information used to indicate the position of the target point to be found by the first terminal or indicate the specific path to the target point.

In another implementation, the second terminal determines the target point based on the shared scene image screen, and sends the prompt information to the first terminal. For example, the second terminal delivers a target point maintenance task to the first terminal according to a current actual situation.

In this embodiment of the present application, because a first terminal shares a scene image screen of a current scene of the first terminal with a second terminal, a user of the first terminal can more accurately describe, by using the scene image screen, a scene in which the user is located, and the second terminal can more accurately determine prompt information according to the shared scene image screen and received help request information. Further, because the first terminal displays the prompt information on the scene image screen, the user of the first terminal can more easily and accurately determine a meaning of the prompt information, and more quickly and conveniently find a target point according to the prompt information.

Optionally, in this embodiment of the present application, the second terminal determines, in multiple implementations according to the shared scene image screen, the prompt information used to indicate the position of the target point to be found by the first terminal or indicate the specific path to the target point. For example, the second terminal obtains a preset image screen from a database by means of matching according to the shared scene image screen, and determines a more accurate current position of the first terminal according to the matched preset image screen. The second terminal may further obtain, from the database by means of matching, a target point and prompt information that indicates a specific path to the target point in the preset image screen, and sends the prompt information to the first terminal.

In another optional implementation, a user of the second terminal determines the current position of the user of the first terminal according to the shared scene image screen, and then determines, according to the target point, the prompt information used to indicate the position of the target point to be found by the first terminal or indicate the specific path to the target point. In this way, accuracy of the prompt information can be further improved by using manpower, while in the prior art, improvement of accuracy of the prompt information depends on only a local software system. For example, in the prior art, if the target point is not stored in the local software system, the prompt information cannot be generated for the first terminal by depending on only the local software system. For another example, the target point is a shop inside a mall. Generally, inside details of the mall cannot be reflected by using the local software system. Therefore, prompt information about how to reach a shop inside the mall cannot be indicated to a user. For another example, when the first terminal needs to pass a viaduct before reaching the target point, usually, in the prior art, a layer of the viaduct that needs to be passed cannot be clearly indicated by using the local software system. However, according to the method provided in this embodiment of the present application, when the local software system cannot provide support, more accurate prompt information can be provided for the user by using manpower.

Optionally, in this embodiment of the present application, the second terminal may modify the generated prompt information in real time, so as to update the prompt information; or may add some new prompt information. Specifically, the first terminal receives the updated prompt information sent by the second terminal. The first terminal updates, by using the updated prompt information, the prompt information displayed on the scene image screen.

The updated prompt information is obtained by modifying the prompt information displayed on the scene image screen.

That is, after the second terminal sends the prompt information to the first terminal, the second terminal modifies the prompt information, to obtain the updated prompt information. The second terminal sends the updated prompt information to the first terminal, so that the first terminal updates, by using the updated prompt information, the prompt information displayed on the scene image screen.

In this way, the prompt information can be updated in real time, so that the first terminal more accurately finds the to-be-found target point in time.

Optionally, before step 201, the first terminal sends a help request to the second terminal, and the first terminal receives a help request acceptance response returned by the second terminal. That is, the second terminal receives the help request sent by the first terminal, and the second terminal sends the help request acceptance response to the first terminal. The help request acceptance response is used to establish a screen sharing connection between the first terminal and the second terminal.

For example, the first terminal initiates the help request to the second terminal. The help request initiated by the first terminal is displayed on a display screen of the second terminal, and there are two buttons on the second terminal: an acceptance button and a rejection button. If the user of the second terminal selects the acceptance button, the second terminal sends the help request acceptance response to the first terminal. In this case, the connection is established between the first terminal and the second terminal.

Optionally, after the connection is established between the first terminal and the second terminal, the first terminal may send the scene image screen of the current scene of the first terminal to the second terminal, or the first terminal may send some text information to the second terminal, or the first terminal may send some audio information to the second terminal. For example, the first terminal sends a piece of audio information to the second terminal, such as "I want to go to the mall A, please show me the way?", or sends a piece of text information: "Turn left or right?" or "Left or right?".

Optionally, the scene image screen includes: an image screen or a video screen obtained by shooting the current scene of the first terminal by a camera device connected to the first terminal, and/or a GPS map screen that includes a position of the current scene of the first terminal.

For example, the camera device connected to the first terminal may perform image shooting or video shooting on the current scene of the first terminal. If the image shooting is performed, a shot image screen may be shared with the second terminal. If the video shooting is performed, a shot video screen may be shared with the second terminal. For example, a video call is initiated between the first terminal and the second terminal, and the scene image screen of the current scene of the first terminal may be displayed on both screens of the first terminal and the second terminal. FIG. 2c is a schematic diagram of an example of a scene image screen according to an embodiment of the present application. The first terminal displays, on a display screen of the first terminal, an image screen or a video screen that is currently shot by a camera of the first terminal. Content displayed on the display screen of the first terminal is shown in FIG. 2c. The first terminal shares the image screen or the video screen that is currently shot by the camera of the first terminal with the second terminal. Content displayed on the display screen of the second terminal is consistent with the content shown in FIG. 2c.

For another example, the user marks a current position of the user on a GPS map. A GPS map screen that includes the position of the current scene of the first terminal is displayed on a display screen of the first terminal. In this case, because the first terminal shares the scene image screen with the second terminal, a current display screen of the second terminal is also the GPS map screen that includes the position of the current scene of the first terminal. FIG. 2d is a schematic diagram of an example of another scene image screen according to an embodiment of the present application. The first terminal displays the GPS map screen that includes the position of the current scene of the first terminal on the display screen of the first terminal. Content displayed on the display screen of the first terminal is shown in FIG. 2d. The first terminal shares the GPS map screen that includes the position of the current scene of the first terminal with the second terminal. Content displayed on the display screen of the second terminal is consistent with the content shown in FIG. 2d.

Optionally, the prompt information includes at least one piece of the following information: mark information used to indicate the position of the target point or indicate the specific path to the target point, text information used to indicate the position of the target point or indicate the specific path to the target point, or audio information used to indicate the position of the target point or indicate the specific path to the target point.

Optionally, the mark information may be used to indicate the position of the target point, for example, a circle is drawn on the target point; or indicate the specific path to the target point, for example, an arrow line is drawn on the specific path to the target point, or a circle is drawn on a landmark building that is on the specific path to the target point. Similarly, the text information or the audio information may be used to indicate the position of the target point, or indicate the specific path to the target point.

Figure 2E:
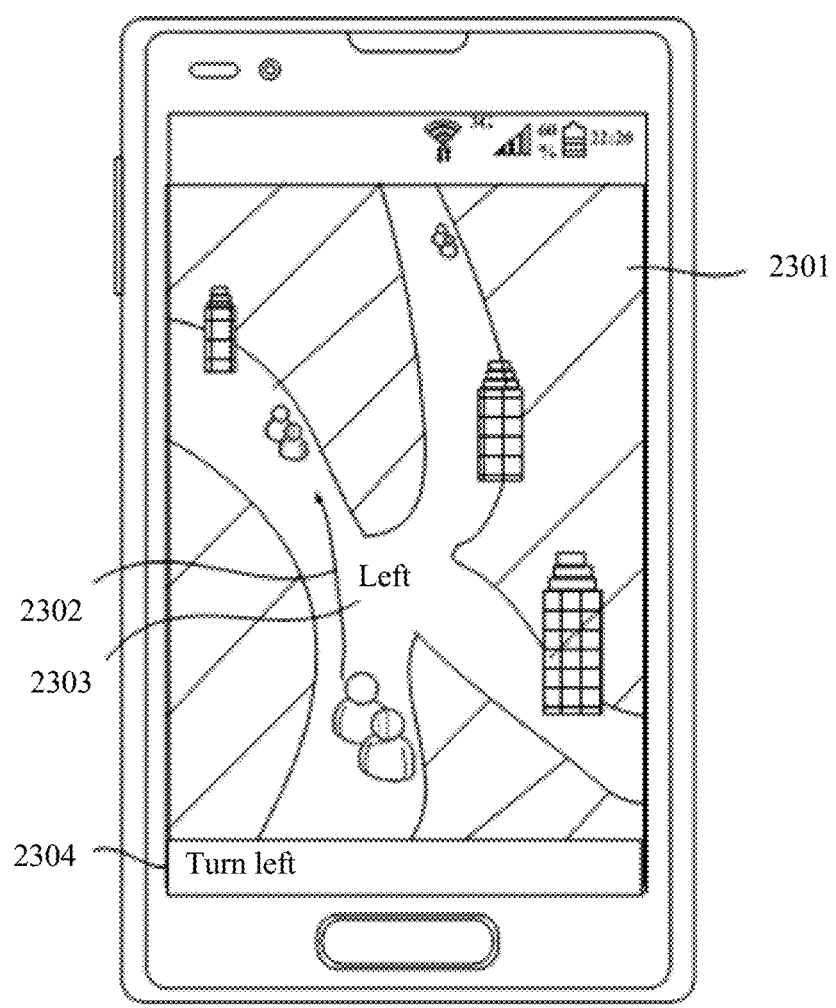
FIG. 2e is a schematic diagram of another scene image screen according to an embodiment of the present application.

FIG. 2e is a schematic diagram of an example of another scene image screen according to an embodiment of the present application. The scene image screen is an image screen or a video screen obtained by shooting the current scene of the first terminal by a camera device connected to the first terminal. The second terminal adds prompt information to a scene image screen 2301 shared by the first terminal. A scene image screen obtained after the second terminal adds the prompt information to a display screen of the second terminal is consistent with content shown in FIG. 2e. As shown in FIG. 2e, the prompt information includes mark information 2302 used to indicate the specific path to the target point, text information 2303 used to indicate the specific path to the target point, and text information 2304 used to indicate the specific path to the target point. In this embodiment of the present application, the mark information is mark information generated according to a touch operation on the shared scene image screen, for example, the mark information 2302 is a curve with an arrow. The text information 2303 used to indicate the specific path to the target point may be a character "Left" written on the scene image screen by means of touching. The text information 2304 used to indicate the specific path to the target point is "Turn left" in FIG. 2e. Alternatively, the "Turn left" may be audio information. That is, in this embodiment of the present application, the text information 2303 used to indicate the specific path to the target point may be text information, of the specific path, generated according to a touch track, or may be conventional text information, for example, "Turn left" written in an instant message box. Optionally, the text information 2304 is in an instant message dialog box, and the dialog box may be used to transmit text information and audio information that are used for communication between the first terminal and the second terminal.

Figure 2F:
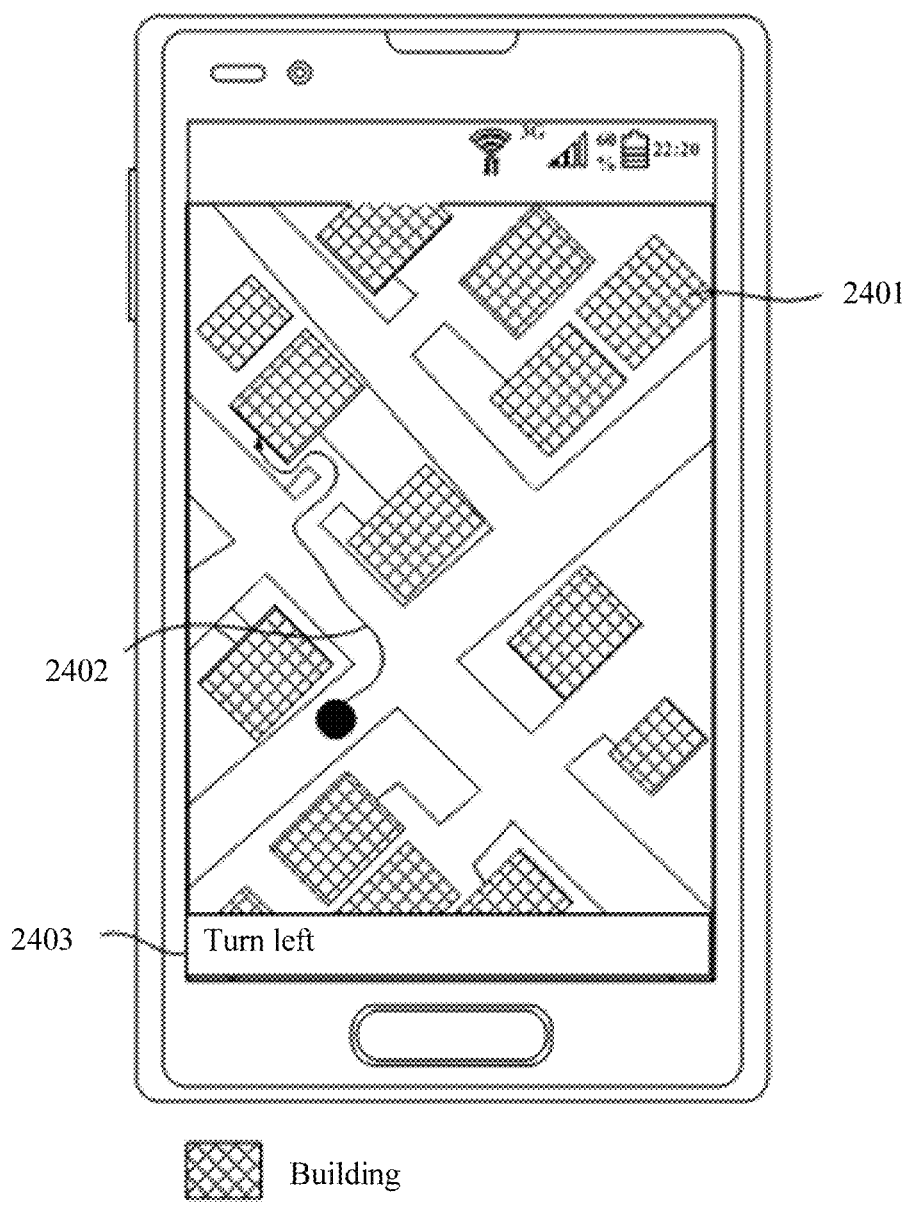
FIG. 2f is a schematic diagram of another scene image screen according to an embodiment of the present application.

FIG. 2f is a schematic diagram of an example of another scene image screen according to an embodiment of the present application. As shown in FIG. 2f, the scene image screen is a GPS map screen that includes the position of the current scene of the first terminal. The second terminal adds prompt information to a scene image screen 2401 shared by the first terminal. A scene image screen obtained after the second terminal adds the prompt information to a display screen of the second terminal is consistent with content shown in FIG. 2f. As shown in FIG. 2f, the prompt information includes mark information 2402 used to indicate the specific path to the target point. In this embodiment of the present application, the mark information is mark information generated according to a touch operation on the shared scene image screen, for example, the mark information 2402 is a curve with an arrow. Text information 2403 used to indicate the specific path to the target point is "Turn left" in FIG. 2f. Alternatively, the "Turn left" may be audio information. Optionally, the text information 2403 used to indicate the specific path to the target point is in an instant message dialog box, and the dialog box may be used to transmit text information and audio information that are used for communication between the first terminal and the second terminal.

Optionally, in this embodiment of the present application, when the scene image screen is the video screen obtained by shooting the current scene of the first terminal by the camera device connected to the first terminal, in an implementation, the second terminal may add the prompt information to a dynamic video screen.

In an optional implementation, when the scene image screen is the video screen obtained by shooting the current scene of the first terminal by the camera device connected to the first terminal, when receiving a first operation instruction, the second terminal locks, as a static picture, the video screen displayed by the second terminal. The second terminal displays, on the static picture, a received touch track used to indicate the position of the target point to be found by the first terminal or indicate the specific path to the target point. The second terminal sets the touch track as mark information, and/or generates text information of the specific path according to the touch track, and restores the locked static picture to the video screen shared by the first terminal. Optionally, the first operation instruction is double tapping or single tapping the video screen displayed by the second terminal. The second terminal performs switching between the static picture and the video screen according to whether the video screen is double tapped or single tapped. When the second terminal locks the video screen as a static picture, the prompt information can be more clearly and conveniently generated on the display screen of the second terminal.

Optionally, in this embodiment of the present application, when the prompt information is the mark information, the mark information is any one of or any combination of the following marks: curve mark information, straight line mark information, arrow line mark information, or closed graph mark information.

For example, when the scene image screen includes the image screen or the video screen obtained by shooting the current scene of the first terminal by the camera device connected to the first terminal, and mark information added to the image screen or the video screen is a circle, that is, closed graph mark information, an area within the circle may represent the target point, and curve mark information, straight line mark information, and arrow line mark information may all represent the specific path. Alternatively, single tapping a position on the display screen may indicate that the position is the position of the target point or a direction of the position of the target point. Double tapping a position on the display screen may lock the video screen as a static picture, or restore a locked static picture to the video screen.

For example, when the scene image screen includes the GPS map screen that includes the position of the current scene of the first terminal, and mark information added to the GPS map screen is a circle, that is, closed graph mark information, an area within the circle may represent the target point, and curve mark information, straight line mark information, and arrow line mark information may all represent the specific path. Single tapping a position on the display screen may indicate that the position is the position of the target point. A length of a path from the position the current scene of the first terminal on the GPS map screen to the target point may be calculated by double tapping the GPS map screen. A map may be scaled and moved according to a two-finger pinch and stretch touch gesture on the GPS map screen.

Optionally, when the prompt information is the mark information used to indicate the specific path to the target point, the first terminal receives position information that is of the mark information on the scene image screen and sent by the second terminal. The first terminal displays, according to the received position information, the mark information in a corresponding position on the scene image screen displayed by the first terminal. That is, the second terminal sends the position information of the mark information on the scene image screen to the first terminal. The position information is used to enable the first terminal to display, according to the received position information, the mark information in the corresponding position on the scene image screen displayed by the first terminal.

That is, when the prompt information is the mark information used to indicate the specific path to the target point, the mark information needs to movement with a position of the first terminal. For example, the second terminal generates the mark information on the display screen of the second terminal, for example, the mark information 2302 shown in FIG. 2e. It may be learned that the mark information 2302 is a curve with an arrow, and the mark information 2302 is on a leftmost road. In this case, the first terminal receives the prompt information sent by the second terminal, and the first terminal further needs to receive the position information that is of the mark information on the scene image screen and sent by the second terminal. Then, the first terminal displays, according to the received position information, the mark information in the corresponding position on the scene image screen displayed by the first terminal. That is, the first terminal finally needs to display the mark information 2302 on a leftmost road on the display screen of the first terminal. In this way, the user of the first terminal can quite visually learn how to advance.

Optionally, the text information 2303 used to indicate the specific path to the target point is generated according to a touch track, and the first terminal further receives position information that is of the text information on the scene image screen and that is used to indicate the specific path to the target point and generated according to a touch track. The first terminal displays, in a corresponding position on the scene image screen displayed by the first terminal and according to the received position information, text information that is used to indicate the specific path to the target point and generated according to the touch track. That is, the first terminal further displays the text information 2303 "Left" used to indicate the specific path to the target point on the leftmost road on the display screen of the first terminal.

Preferably, in this embodiment of the present application, when the second terminal generates the prompt information on the shared scene image screen, the display screen of the second terminal is consistent with content shown in FIG. 2e. In this case, after the first terminal receives the prompt information, an image displayed on the display screen of the first terminal is consistent with the content shown in FIG. 2e.

In this embodiment of the present application, after the second terminal generates the prompt information and sends the prompt information to the first terminal, the first terminal usually moves according to the prompt information. Optionally, the prompt information also needs to movement with the first terminal. For example, the shared scene image screen is the video screen shot by the camera device connected to the first terminal, and the prompt information is a circle on a building A. In this case, the video screen shot by the camera device connected to the first terminal changes when the first terminal moves, and the building A moves on the video screen shot by the camera device. Optionally, in this embodiment of the present application, the circle on the building A also moves, and the circle is always on the building A.

In this embodiment of the present application, specifically, the prompt information moves with the first terminal in multiple implementations. For example, in an image target tracking algorithm, the prompt information on the building A is captured from a perspective of image recognition, and then the prompt information is always on the building A in a recognized image.

In another optional implementation, the first terminal obtains first movement data of movement of the camera device connected to the first terminal. The first terminal converts the first movement data into second movement data of movement of the mark information. The first terminal moves, according to the second movement data obtained after the conversion, the mark information displayed on the scene image screen, so that the moved mark information matches a scene image screen shot by the moved camera device. Optionally, the first terminal displays the mark information in a corresponding position at a layer that is parallel to a display plane of the scene image screen. Optionally, the first terminal obtains, by using an acceleration sensor and a gyro sensor, the first movement data of the movement of the camera device connected to the first terminal.

That is, the second terminal obtains the first movement data of the movement of the camera device connected to the first terminal. The second terminal converts the first movement data into the second movement data of the movement of the mark information. The second terminal moves, according to the second movement data obtained after the conversion, the mark information displayed on the scene image screen, so that the moved mark information matches the scene image screen shot by the moved camera device. Optionally, the second terminal displays the mark information at a layer that is parallel to a display plane of the scene image screen. Optionally, the first movement data is the data obtained by the first terminal by using the acceleration sensor and the gyro sensor of the first terminal.

Figure 2G:
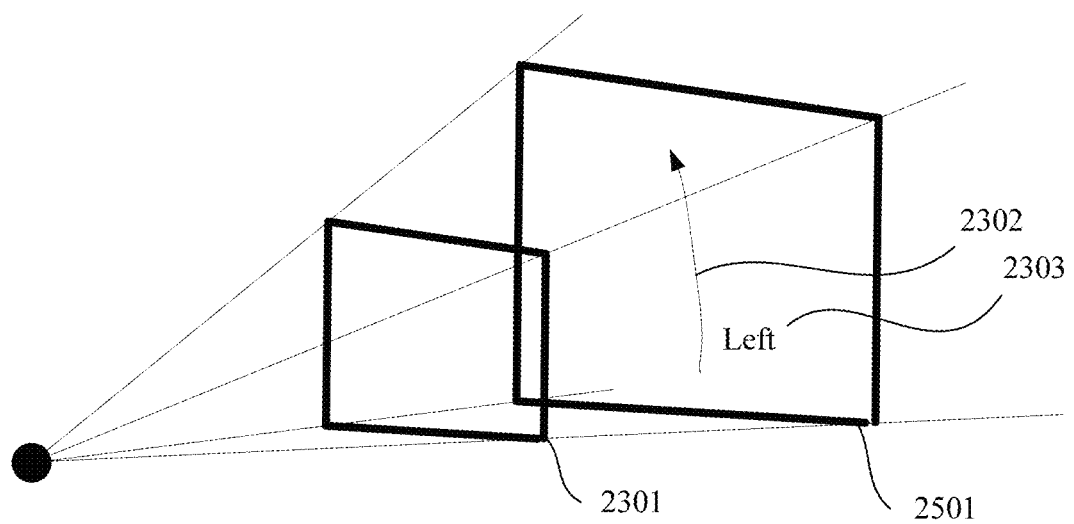
FIG. 2g is a schematic diagram of displaying mark information at a layer that is parallel to a display plane of a scene image screen according to an embodiment of the present application.

FIG. 2g is a schematic diagram of an example of displaying mark information at a layer that is parallel to a display plane of a scene image screen according to an embodiment of the present application. As shown in FIG. 2g, a layer 2501 is established in a position that is parallel to the scene image screen 2301 by using an open graphics library (OpenGL) technology, and the mark information 2302 is displayed at the layer 2501. Optionally, the text information 2303 generated according to the touch track is also displayed at the layer 2501.

Optionally, the first terminal obtains, by using the acceleration sensor and the gyro sensor, the first movement data of the movement of the camera device connected to the first terminal. The first terminal converts the first movement data into the second movement data of the movement of the mark information. Specifically, the mark information needs to movement leftward/rightward on the shared scene image screen when it is detected, by using the acceleration sensor, that the first terminal moves along an X-axis; the mark information needs to movement upward/downward on the shared scene image screen when it is detected, by using the acceleration sensor, that the first terminal moves along a Y-axis; the mark information needs to movement forward/backward on the shared scene image screen when it is detected, by using the acceleration sensor, that the first terminal moves along a Z-axis. The mark information needs to rotate around an X-axis on the shared scene image screen when it is detected, by using the gyro sensor, that the first terminal rotates around an X-axis; the mark information needs to rotate around a Y-axis on the shared scene image screen when it is detected, by using the gyro sensor, that the first terminal rotates around a Y-axis; the mark information needs to rotate around a Z-axis on the shared scene image screen when it is detected, by using the gyro sensor, that the first terminal rotates around a Z-axis.

Optionally, because cumulative errors are generated when displacement and a rotation angle are calculated by using an acceleration sensor and a gyro sensor, in calculation of the second movement data, low-pass filtering needs to be first performed on the first movement data collected by the acceleration sensor and the gyro sensor.

Figure 2H:
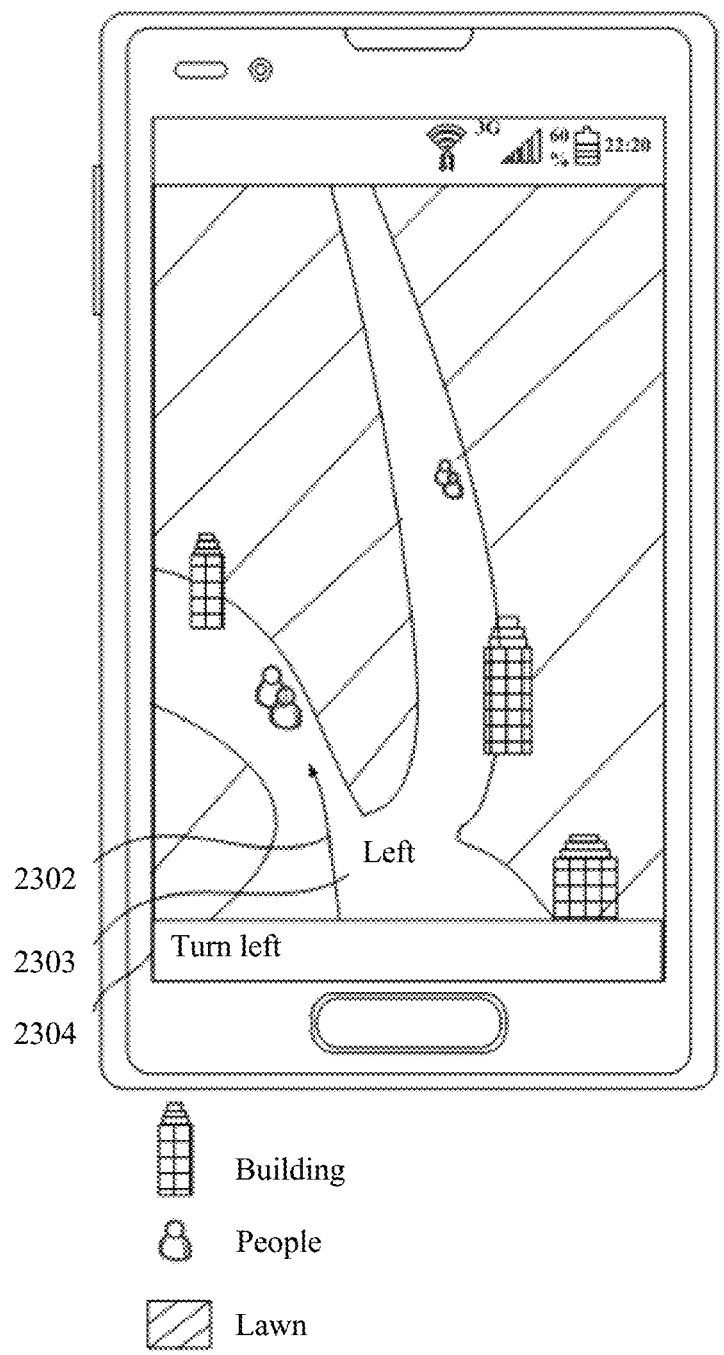
FIG. 2h is a schematic diagram of a display screen obtained after a first terminal moves according to an embodiment of the present application.

FIG. 2h is a schematic diagram of an example of a display screen obtained after a first terminal moves according to an embodiment of the present application. As shown in FIG. 2h, after the first terminal moves forward along the mark information 2302, the mark information 2302 on the display screen of the first terminal moves downward in FIG. 2h. In this case, both content displayed on the display screen of the first terminal and content displayed on the display screen of the second terminal are consistent with content shown in FIG. 2h. In this way, the user of the first terminal can more clearly and accurately reach the target point.

Based on the foregoing content, description is provided with reference to FIG. 2i, FIG. 2j, FIG. 2k, and FIG. 2l, so as to more clearly describe this embodiment of the present application. FIG. 2i is a schematic diagram of an example of a display screen for displaying a scene image screen by a first terminal according to an embodiment of the present application. FIG. 2j is a schematic diagram of an example of a display screen for displaying a scene image screen by a second terminal according to an embodiment of the present application. FIG. 2k is a schematic diagram of an example of a display screen obtained after a second terminal generates prompt information in FIG. 2j according to an embodiment of the present application. FIG. 2l is a schematic diagram of an example of a display screen obtained after a first terminal receives prompt information according to an embodiment of the present application. As shown in FIG. 2i, the scene image screen of the current scene of the first terminal is displayed on the display screen of the first terminal. FIG. 2j shows a display screen of the second terminal obtained after the first terminal shares the scene image screen of the current scene of the first terminal with the second terminal. FIG. 2k is a schematic diagram of a display screen obtained after the second terminal displays the prompt information on the scene image screen shown in FIG. 2j. The second terminal sends the prompt information to the first terminal, and FIG. 2l is a schematic diagram of a display screen of the first terminal obtained after the first terminal displays the prompt information on the scene image screen.

Figure 2N:
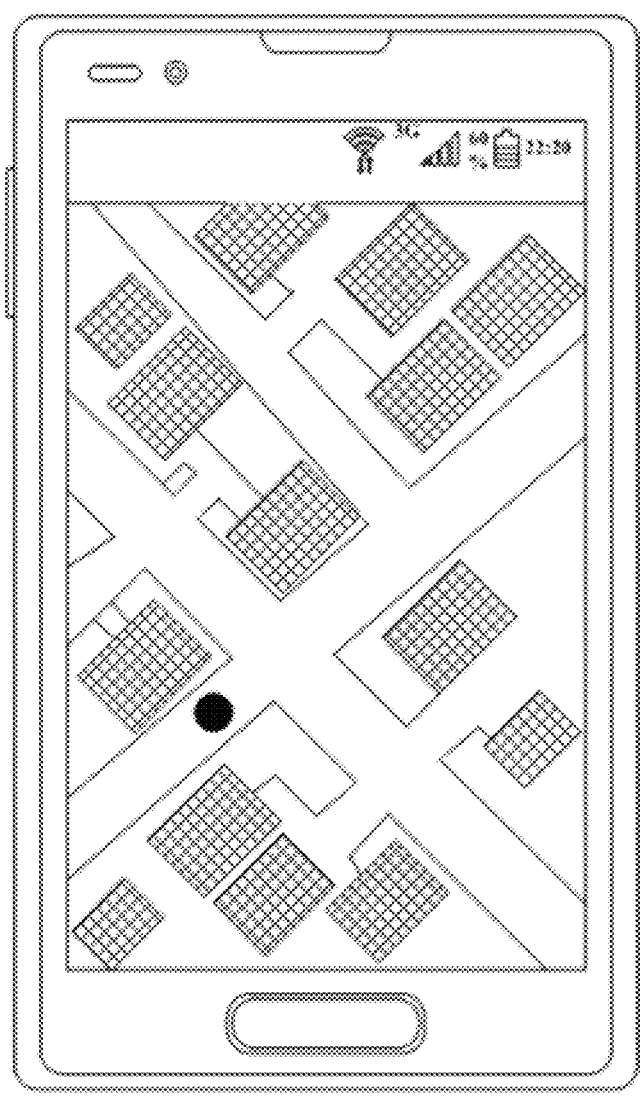
FIG. 2n is a schematic diagram of a display screen for displaying a scene image screen by a second terminal according to an embodiment of the present application.

Based on the foregoing content, description is provided with reference to FIG. 2m, FIG. 2n, FIG. 2o, and FIG. 2p, so as to more clearly describe this embodiment of the present application. FIG. 2m is a schematic diagram of an example of a display screen for displaying a scene image screen by a first terminal according to an embodiment of the present application. FIG. 2n is a schematic diagram of an example of a display screen for displaying a scene image screen by a second terminal according to an embodiment of the present application. FIG. 2o is a schematic diagram of an example of a display screen obtained after a second terminal generates prompt information in FIG. 2n according to an embodiment of the present application. FIG. 2p is a schematic diagram of an example of a display screen obtained after a first terminal receives prompt information according to an embodiment of the present application. As shown in FIG. 2m, the scene image screen of the current scene of the first terminal is displayed on the display screen of the first terminal. FIG. 2n shows a display screen of the second terminal obtained after the first terminal shares the scene image screen of the current scene of the first terminal with the second terminal. FIG. 2o is a schematic diagram of a display screen obtained after the second terminal displays the prompt information on the scene image screen shown in FIG. 2n. The second terminal sends the prompt information to the first terminal. FIG. 2p is a schematic diagram of a display screen of the first terminal obtained after the first terminal displays the prompt information on the scene image screen.

Optionally, when the scene image screen includes both the image screen or the video screen obtained by shooting the current scene of the first terminal by the camera device connected to the first terminal, and the GPS map screen that includes the position of the current scene of the first terminal, the display screen for displaying the scene image screen by the first terminal includes a first area and a second area.

The first area is used to display the image screen or the video screen obtained by shooting the current scene of the first terminal by the camera device connected to the first terminal, and the second area is used to display the GPS map screen that includes the position of the current scene of the first terminal or display no content.

Alternatively, the first area is used to display the GPS map screen that includes the position of the current scene of the first terminal, and the second area is used to display the image screen or the video screen obtained by shooting the current scene of the first terminal by the camera device connected to the first terminal or display no content.

Optionally, when the displayed scene image screen is touched, the first terminal switches content displayed in the first area and content displayed in the second area.

Optionally, when the scene image screen includes both the image screen or the video screen obtained by shooting the current scene of the first terminal by the camera device connected to the first terminal, and the GPS map screen that includes the position of the current scene of the first terminal, the display screen for displaying the scene image screen by the second terminal includes a first area and a second area.

The first area is used to display the image screen or the video screen obtained by shooting the current scene of the first terminal by the camera device connected to the first terminal, and the second area is used to display the GPS map screen that includes the position of the current scene of the first terminal or display no content.

Alternatively, the first area is used to display the GPS map screen that includes the position of the current scene of the first terminal, and the second area is used to display the image screen or the video screen obtained by shooting the current scene of the first terminal by the camera device connected to the first terminal or display no content.

Optionally, when the displayed scene image screen is touched, the second terminal switches content displayed in the first area and content displayed in the second area.

Specifically, in this embodiment of the present application, no content is displayed in the second area of the first terminal and/or the second terminal in multiple implementations. For example, the second area is a button, or the second area is a special area.

In this embodiment of the present application, the display screen of the first terminal and/or the second terminal may not include the second area, that is, only the first area is displayed, and no content is displayed in the second area. Content displayed in the first area is switched when the first area is single tapped or double tapped. For example, only the first area is displayed on the display screen of the first terminal, and the first area is used to display the GPS map screen that includes the position of the current scene of the first terminal. In this case, the first area is double tapped, so that the content displayed in the first area is switched to the GPS map screen that includes the position of the current scene of the first terminal.

The display screen of the first terminal is used as an example in the following description. FIG. 2q is a schematic diagram of an example of a display screen according to an embodiment of the present application. FIG. 2r is a schematic diagram of an example of another display screen according to an embodiment of the present application. As shown in FIG. 2q, the display screen of the first terminal includes a first area 21501 and a second area 21502. As shown in FIG. 2q, the image screen or the video screen obtained by shooting the current scene of the first terminal by the camera device connected to the first terminal is displayed in the first area of the first terminal, and the GPS map screen that includes the position of the current scene of the first terminal is displayed in the second area of the first terminal. The display screen of the first terminal is touched, so that content displayed in the first area and content displayed in the second area are switched. FIG. 2r shows a display screen of the first terminal obtained after the switching. The image screen or the video screen obtained by shooting the current scene of the first terminal by the camera device connected to the first terminal is displayed in the second area of the first terminal, and the first area of the first terminal is used to display the GPS map screen that includes the position of the current scene of the first terminal.

Figure 2S:
FIG. 2s is a schematic diagram of a display screen according to an embodiment of the present application.

FIG. 2s is a schematic diagram of an example of a display screen according to an embodiment of the present application. As shown in FIG. 2s, the image screen or the video screen obtained by shooting the current scene of the first terminal by the camera device connected to the first terminal, the GPS map screen that includes the position of the current scene of the first terminal, and an instant dialog box may be displayed on the display screen of the first terminal or the second terminal at a same time. The instant dialog box is used to perform real-time dialog with the second terminal.

Optionally, in this embodiment of the present application, in a process from establishment of the connection between the first terminal and the second terminal to end of navigation of the second terminal, the first terminal may receive, for multiple times, prompt information sent by the second terminal, and the second terminal may modify the prompt information at any time.

It may be learned from the foregoing content that, in this embodiment of the present application, a first terminal shares a scene image screen of a current scene of the first terminal with a second terminal, the first terminal receives prompt information sent by the second terminal, and the first terminal displays the prompt information on the scene image screen. The prompt information is used to indicate a position of a target point to be found by the first terminal or indicate a specific path to the target point, and the prompt information is determined by the second terminal according to the shared scene image screen and the target point. Because the first terminal shares the scene image screen of the current scene of the first terminal with the second terminal, a user of the first terminal can more accurately describe, by using the scene image screen, a scene in which the user is located, and the second terminal can more accurately determine the prompt information according to the shared scene image screen and received help request information. Further, because the first terminal displays the prompt information on the scene image screen, the user of the first terminal can more easily and accurately determine a meaning of the prompt information, and more quickly and conveniently find the target point according to the prompt information.

Figure 3:
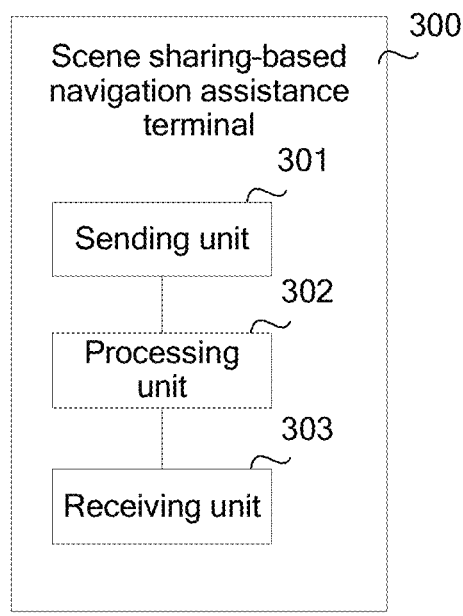
FIG. 3 is a schematic structural diagram of a scene sharing-based navigation assistance terminal according to an embodiment of the present application.

FIG. 3 is a schematic structural diagram of an example of a scene sharing-based navigation assistance terminal according to an embodiment of the present application. Based on a same concept, this embodiment of the present application provides a schematic structural diagram of a scene sharing-based navigation assistance terminal. As shown in FIG. 3, a scene sharing-based navigation assistance terminal 300 includes a sending unit 301, a processing unit 302, and a receiving unit 303. The sending unit 301 is configured to share a scene image screen of a current scene of a first terminal with a second terminal. The receiving unit 303 is configured to receive prompt information sent by the second terminal. The processing unit 302 is configured to display the prompt information on the scene image screen. The prompt information is used to indicate a position of a target point to be found by the first terminal or indicate a specific path to the target point, and the prompt information is determined by the second terminal according to the shared scene image screen and the target point.

Optionally, sending unit 301 is further configured to send help request information to the second terminal before the prompt information sent by the second terminal is received, and the help request information includes information about the target point to be found by the first terminal.

Optionally, the scene image screen includes: an image screen or a video screen obtained by shooting the current scene of the first terminal by a camera device connected to the first terminal, and/or a GPS map screen that includes a position of the current scene of the first terminal.

Optionally, the prompt information includes at least one piece of the following information: mark information used to indicate the position of the target point or indicate the specific path to the target point, text information used to indicate the position of the target point or indicate the specific path to the target point, or audio information used to indicate the position of the target point or indicate the specific path to the target point.

Optionally, when the prompt information is the mark information used to indicate the position of the target point or indicate the specific path to the target point, the receiving unit 303 is further configured to receive position information that is of the mark information on the scene image screen and sent by the second terminal. The processing unit 302 is configured to display, according to the received position information, the mark information in a corresponding position on the scene image screen displayed by the first terminal.

Optionally, the processing unit 302 is further configured to: obtain first movement data of movement of the camera device connected to the first terminal, convert the first movement data into second movement data of movement of the mark information, and move, according to the second movement data obtained after the conversion, the mark information displayed on the scene image screen, so that the moved mark information matches a scene image screen shot by the moved camera device.

Optionally, the processing unit 302 is configured to display the mark information in a corresponding position at a layer that is parallel to a display plane of the scene image screen.

Optionally, the processing unit 302 is configured to obtain, by using an acceleration sensor and a gyro sensor, the first movement data of the movement of the camera device connected to the first terminal.

Optionally, the mark information is any one of or any combination of the following marks: curve mark information, straight line mark information, arrow line mark information, or closed graph mark information.

Optionally, when the scene image screen includes both the image screen or the video screen obtained by shooting the current scene of the first terminal by the camera device connected to the first terminal, and the GPS map screen that includes the position of the current scene of the first terminal, a display screen for displaying the scene image screen by the processing unit 302 includes a first area and a second area. The first area is used to display the image screen or the video screen obtained by shooting the current scene of the first terminal by the camera device connected to the first terminal, and the second area is used to display the GPS map screen that includes the position of the current scene of the first terminal or display no content. Alternatively, the first area is used to display the GPS map screen that includes the position of the current scene of the first terminal, and the second area is used to display the image screen or the video screen obtained by shooting the current scene of the first terminal by the camera device connected to the first terminal or display no content.

Optionally, the processing unit 302 is further configured to: when the displayed scene image screen is touched, switch content displayed in the first area and content displayed in the second area.

Optionally, the sending unit 301 is further configured to send a help request to the second terminal, and the receiving unit 303 is further configured to receive a help request acceptance response returned by the second terminal. The help request acceptance response is used to establish a screen sharing connection between the first terminal and the second terminal.

Optionally, the receiving unit 303 is further configured to receive updated prompt information sent by the second terminal.

The processing unit 302 is further configured to update, by using the updated prompt information, the prompt information displayed on the scene image screen. The updated prompt information is obtained by modifying the prompt information displayed on the scene image screen.

It may be learned from the foregoing content that, in this embodiment of the present application, a first terminal shares a scene image screen of a current scene of the first terminal with a second terminal, the first terminal receives prompt information sent by the second terminal, and the first terminal displays the prompt information on the scene image screen. The prompt information is used to indicate a position of a target point to be found by the first terminal or indicate a specific path to the target point, and the prompt information is determined by the second terminal according to the shared scene image screen and the target point. Because the first terminal shares the scene image screen of the current scene of the first terminal with the second terminal, a user of the first terminal can more accurately describe, by using the scene image screen, a scene in which the user is located, and the second terminal can more accurately determine the prompt information according to the shared scene image screen and received help request information. Further, because the first terminal displays the prompt information on the scene image screen, the user of the first terminal can more easily and accurately determine a meaning of the prompt information, and more quickly and conveniently find the target point according to the prompt information.

Figure 4:
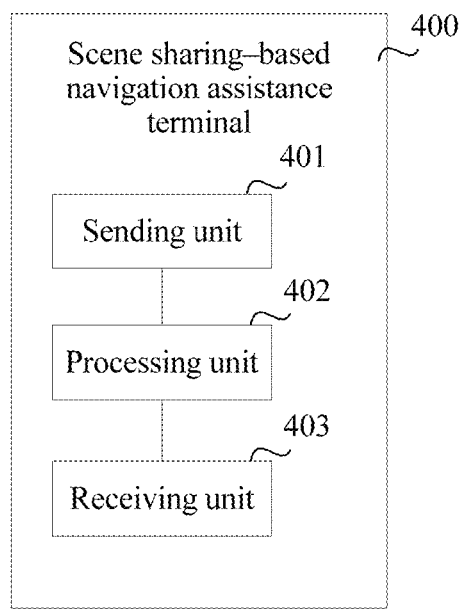
FIG. 4 is a schematic structural diagram of another scene sharing-based navigation assistance terminal according to an embodiment of the present application.

FIG. 4 is a schematic structural diagram of an example of a scene sharing-based navigation assistance terminal according to an embodiment of the present application. Based on a same concept, this embodiment of the present application provides a schematic structural diagram of a scene sharing-based navigation assistance terminal. As shown in FIG. 4, a scene sharing-based navigation assistance terminal 400 includes a sending unit 401, a processing unit 402, and a receiving unit 403. The receiving unit 403 is configured to receive a scene image screen that is shared by a first terminal and that is of a current scene of the first terminal. The processing unit 402 is configured to determine, according to the shared scene image screen, prompt information used to indicate a position of a target point to be found by the first terminal or indicate a specific path to the target point. The sending unit 401 is configured to send the prompt information to the first terminal, so that the first terminal displays the prompt information on the scene image screen.

Optionally, the receiving unit 403 is further configured to receive help request information sent by the first terminal, and the help request information includes information about the target point to be found by the first terminal. The processing unit 402 is configured to determine, according to the shared scene image screen and the information about the target point in the help request information, the prompt information used to indicate the position of the target point to be found by the first terminal or indicate the specific path to the target point.

Optionally, the scene image screen includes: an image screen or a video screen obtained by shooting the current scene of the first terminal by a camera device connected to the first terminal, and/or a GPS map screen that includes a position of the current scene of the first terminal.

Optionally, the prompt information includes at least one piece of the following information: mark information used to indicate the position of the target point or indicate the specific path to the target point, text information used to indicate the position of the target point or indicate the specific path to the target point, or audio information used to indicate the position of the target point or indicate the specific path to the target point.

Optionally, when the prompt information is the mark information used to indicate the position of the target point or indicate the specific path to the target point, the sending unit 401 is further configured to send position information of the mark information on the scene image screen. The position information is used to enable the first terminal to display, according to the received position information, the mark information in a corresponding position on the scene image screen displayed by the first terminal.

Optionally, when the scene image screen is the video screen obtained by shooting the current scene of the first terminal by the camera device connected to the first terminal, the processing unit 402 is configured to: when a first operation instruction is received, lock, as a static picture, the video screen displayed by the second terminal, display, on the static picture, a received touch track used to indicate the position of the target point to be found by the first terminal or indicate the specific path to the target point, set the touch track as the mark information, and/or generate text information of the specific path according to the touch track, and restore the locked static picture to the video screen shared by the first terminal.

Optionally, the first operation instruction is double tapping or single tapping the video screen displayed by the second terminal.

Optionally, the receiving unit 403 is further configured to obtain first movement data of movement of the camera device connected to the first terminal. The processing unit 402 is further configured to convert the first movement data into second movement data of movement of the mark information, and move, according to the second movement data obtained after the conversion, the mark information displayed on the scene image screen, so that the moved mark information matches a scene image screen shot by the moved camera device.

Optionally, the processing unit 402 is configured to display the mark information at a layer that is parallel to a display plane of the scene image screen. Optionally, the first movement data is data obtained by the first terminal by using an acceleration sensor and a gyro sensor of the first terminal. Optionally, the mark information is any one of or any combination of the following marks: curve mark information, straight line mark information, arrow line mark information, or closed graph mark information.

Optionally, when the scene image screen includes both the image screen or the video screen obtained by shooting the current scene of the first terminal by the camera device connected to the first terminal, and the GPS map screen that includes the position of the current scene of the first terminal, a display screen for displaying the scene image screen by the processing unit 402 includes a first area and a second area. The first area is used to display the image screen or the video screen obtained by shooting the current scene of the first terminal by the camera device connected to the first terminal, and the second area is used to display the GPS map screen that includes the position of the current scene of the first terminal or display no content. Alternatively, the first area is used to display the GPS map screen that includes the position of the current scene of the first terminal, and the second area is used to display the image screen or the video screen obtained by shooting the current scene of the first terminal by the camera device connected to the first terminal or display no content.

Optionally, the processing unit 402 is further configured to: when the displayed scene image screen is touched, switch content displayed in the first area and content displayed in the second area.

Optionally, the receiving unit 403 is further configured to receive a help request sent by the first terminal, and the sending unit 401 is further configured to send a help request acceptance response to the first terminal. The help request acceptance response is used to establish a screen sharing connection between the first terminal and the second terminal.

Optionally, the processing unit 402 is further configured to modify the prompt information, to obtain updated prompt information. The sending unit 401 is configured to send the updated prompt information to the first terminal, so that the first terminal updates, by using the updated prompt information, the prompt information displayed on the scene image screen.

It may be learned from the foregoing content that, in this embodiment of the present application, a first terminal shares a scene image screen of a current scene of the first terminal with a second terminal, the first terminal receives prompt information sent by the second terminal, and the first terminal displays the prompt information on the scene image screen. The prompt information is used to indicate a position of a target point to be found by the first terminal or indicate a specific path to the target point, and the prompt information is determined by the second terminal according to the shared scene image screen and the target point. Because the first terminal shares the scene image screen of the current scene of the first terminal with the second terminal, a user of the first terminal can more accurately describe, by using the scene image screen, a scene in which the user is located, and the second terminal can more accurately determine the prompt information according to the shared scene image screen and received help request information. Further, because the first terminal displays the prompt information on the scene image screen, the user of the first terminal can more easily and accurately determine a meaning of the prompt information, and more quickly and conveniently find the target point according to the prompt information.

Figure 5:
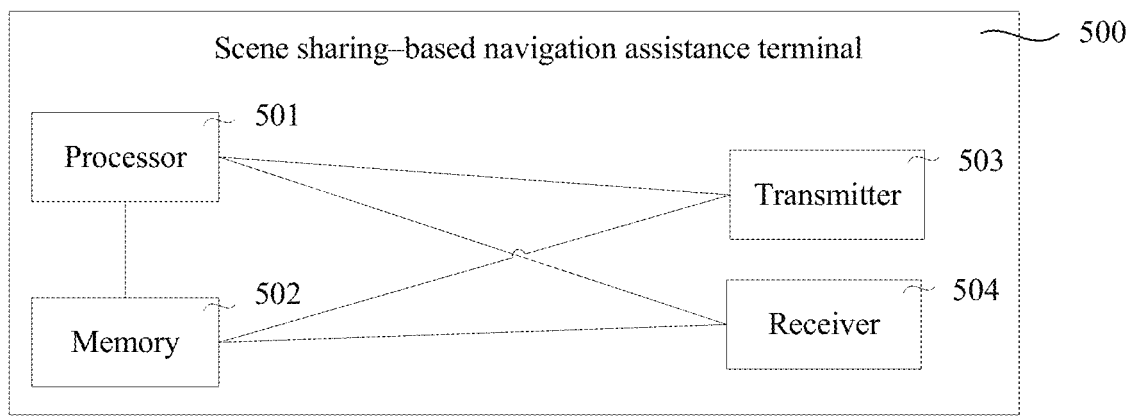
FIG. 5 is a schematic structural diagram of another scene sharing-based navigation assistance terminal according to an embodiment of the present application.

FIG. 5 is a schematic structural diagram of an example of a scene sharing-based navigation assistance terminal according to an embodiment of the present application. Based on a same concept, this embodiment of the present application provides a scene sharing-based schematic structural diagram of a navigation assistance terminal. As shown in FIG. 5, a scene sharing-based navigation assistance terminal 500 includes a processor 501, a transmitter 503, and a receiver 504, and a memory 502. The processor 501 is configured to read a program stored in the memory, to execute the following processes: The transmitter 503 shares a scene image screen of a current scene of a first terminal with a second terminal, and the receiver 504 receives prompt information sent by the second terminal, and displays the prompt information on the scene image screen. The prompt information is used to indicate a position of a target point to be found by the first terminal or indicate a specific path to the target point, and the prompt information is determined by the second terminal according to the shared scene image screen and the target point.

Optionally, the transmitter 503 is further configured to send help request information to the second terminal before the prompt information sent by the second terminal is received, and the help request information includes information about the target point to be found by the first terminal.

Optionally, the scene image screen includes: an image screen or a video screen obtained by shooting the current scene of the first terminal by a camera device connected to the first terminal, and/or a GPS map screen that includes a position of the current scene of the first terminal.

Optionally, the prompt information includes at least one piece of the following information: mark information used to indicate the position of the target point or indicate the specific path to the target point, text information used to indicate the position of the target point or indicate the specific path to the target point, or audio information used to indicate the position of the target point or indicate the specific path to the target point.

Optionally, when the prompt information is the mark information used to indicate the position of the target point or indicate the specific path to the target point, the receiver 504 is further configured to receive position information that is of the mark information on the scene image screen and sent by the second terminal. The processor 501 is configured to display, according to the received position information, the mark information in a corresponding position on the scene image screen displayed by the first terminal.

Optionally, the processor 501 is further configured to: obtain first movement data of movement of the camera device connected to the first terminal, convert the first movement data into second movement data of movement of the mark information, and move, according to the second movement data obtained after the conversion, the mark information displayed on the scene image screen, so that the moved mark information matches a scene image screen shot by the moved camera device.

Optionally, the processor 501 is configured to display the mark information in a corresponding position at a layer that is parallel to a display plane of the scene image screen.

Optionally, the processor 501 is configured to obtain, by using an acceleration sensor and a gyro sensor, the first movement data of the movement of the camera device connected to the first terminal.

Optionally, the mark information is any one of or any combination of the following marks: curve mark information, straight line mark information, arrow line mark information, or closed graph mark information.

Optionally, when the scene image screen includes both the image screen or the video screen obtained by shooting the current scene of the first terminal by the camera device connected to the first terminal, and the GPS map screen that includes the position of the current scene of the first terminal, a display screen for displaying the scene image screen by the processor 501 includes a first area and a second area. The first area is used to display the image screen or the video screen obtained by shooting the current scene of the first terminal by the camera device connected to the first terminal, and the second area is used to display the GPS map screen that includes the position of the current scene of the first terminal or display no content.

Alternatively, the first area is used to display the GPS map screen that includes the position of the current scene of the first terminal, and the second area is used to display the image screen or the video screen obtained by shooting the current scene of the first terminal by the camera device connected to the first terminal or display no content.

Optionally, the processor 501 is further configured to: when the displayed scene image screen is touched, switch content displayed in the first area and content displayed in the second area.

Optionally, the transmitter 503 is further configured to send a help request to the second terminal.

The receiver 504 is further configured to receive a help request acceptance response returned by the second terminal, and the help request acceptance response is used to establish a screen sharing connection between the first terminal and the second terminal.

Optionally, the receiver 504 is further configured to receive updated prompt information sent by the second terminal. The processor 501 is further configured to update, by using the updated prompt information, the prompt information displayed on the scene image screen. The updated prompt information is obtained by modifying the prompt information displayed on the scene image screen.

It may be learned from the foregoing content that, in this embodiment of the present application, a first terminal shares a scene image screen of a current scene of the first terminal with a second terminal, the first terminal receives prompt information sent by the second terminal, and the first terminal displays the prompt information on the scene image screen. The prompt information is used to indicate a position of a target point to be found by the first terminal or indicate a specific path to the target point, and the prompt information is determined by the second terminal according to the shared scene image screen and the target point. Because the first terminal shares the scene image screen of the current scene of the first terminal with the second terminal, a user of the first terminal can more accurately describe, by using the scene image screen, a scene in which the user is located, and the second terminal can more accurately determine the prompt information according to the shared scene image screen and received help request information. Further, because the first terminal displays the prompt information on the scene image screen, the user of the first terminal can more easily and accurately determine a meaning of the prompt information, and more quickly and conveniently find the target point according to the prompt information.

Figure 6:
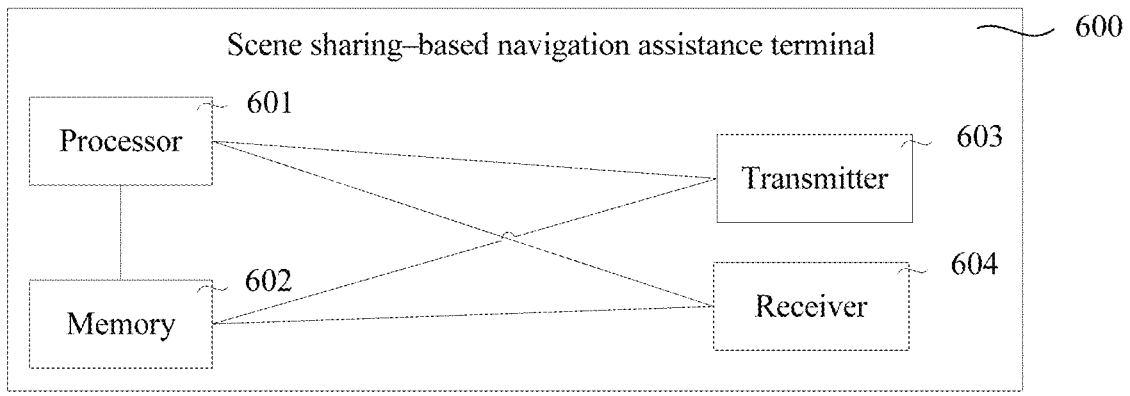
FIG. 6 is a schematic structural diagram of another scene sharing-based navigation assistance terminal according to an embodiment of the present application.

FIG. 6 is a schematic structural diagram of an example of a scene sharing-based navigation assistance terminal according to an embodiment of the present application. Based on a same concept, this embodiment of the present application provides a schematic structural diagram of a scene sharing-based navigation assistance terminal. As shown in FIG. 6, a scene sharing-based navigation assistance terminal 600 includes a processor 601, a transmitter 603, a receiver 604, and a memory 602. The processor 601 is configured to read a program stored in the memory, to execute the following processes: The receiver 604 receives a scene image screen that is shared by a first terminal and that is of a current scene of the first terminal, and determines, according to the shared scene image screen, prompt information used to indicate a position of a target point to be found by the first terminal or indicate a specific path to the target point, and the transmitter 603 sends the prompt information to the first terminal, so that the first terminal displays the prompt information on the scene image screen.

Optionally, the receiver 604 is further configured to receive help request information sent by the first terminal, and the help request information includes information about the target point to be found by the first terminal. The processor 601 is configured to determine, according to the shared scene image screen and the information about the target point in the help request information, the prompt information used to indicate the position of the target point to be found by the first terminal or indicate the specific path to the target point.

Optionally, the scene image screen includes: an image screen or a video screen obtained by shooting the current scene of the first terminal by a camera device connected to the first terminal, and/or a GPS map screen that includes a position of the current scene of the first terminal.

Optionally, the prompt information includes at least one piece of the following information: mark information used to indicate the position of the target point or indicate the specific path to the target point, text information used to indicate the position of the target point or indicate the specific path to the target point, or audio information used to indicate the position of the target point or indicate the specific path to the target point.

Optionally, when the prompt information is the mark information used to indicate the position of the target point or indicate the specific path to the target point, the transmitter 603 is further configured to send position information of the mark information on the scene image screen. The position information is used to enable the first terminal to display, according to the received position information, the mark information in a corresponding position on the scene image screen displayed by the first terminal.

Optionally, when the scene image screen is the video screen obtained by shooting the current scene of the first terminal by the camera device connected to the first terminal, the processor 601 is configured to: when a first operation instruction is received, lock, as a static picture, the video screen displayed by the second terminal, display, on the static picture, a received touch track used to indicate the position of the target point to be found by the first terminal or indicate the specific path to the target point, set the touch track as the mark information, and/or generate text information of the specific path according to the touch track, and restore the locked static picture to the video screen shared by the first terminal.

Optionally, the first operation instruction is double tapping or single tapping the video screen displayed by the second terminal.

Optionally, the receiver 604 is further configured to obtain first movement data of movement of the camera device connected to the first terminal. The processor 601 is further configured to: convert the first movement data into second movement data of movement of the mark information, and move, according to the second movement data obtained after the conversion, the mark information displayed on the scene image screen, so that the moved mark information matches a scene image screen shot by the moved camera device.

Optionally, the processor 601 is configured to display the mark information at a layer that is parallel to a display plane of the scene image screen. Optionally, the first movement data is data obtained by the first terminal by using an acceleration sensor and a gyro sensor of the first terminal. Optionally, the mark information is any one of or any combination of the following marks: curve mark information, straight line mark information, arrow line mark information, or closed graph mark information.

Optionally, when the scene image screen includes both the image screen or the video screen obtained by shooting the current scene of the first terminal by the camera device connected to the first terminal, and the GPS map screen that includes the position of the current scene of the first terminal, a display screen for displaying the scene image screen by the processor 601 includes a first area and a second area. The first area is used to display the image screen or the video screen obtained by shooting the current scene of the first terminal by the camera device connected to the first terminal, and the second area is used to display the GPS map screen that includes the position of the current scene of the first terminal or display no content. Alternatively, the first area is used to display the GPS map screen that includes the position of the current scene of the first terminal, and the second area is used to display the image screen or the video screen obtained by shooting the current scene of the first terminal by the camera device connected to the first terminal or display no content.

Optionally, the processor 601 is further configured to: when the displayed scene image screen is touched, switch content displayed in the first area and content displayed in the second area.

Optionally, the receiver 604 is further configured to receive a help request sent by the first terminal.

The transmitter 603 is further configured to send a help request acceptance response to the first terminal, and the help request acceptance response is used to establish a screen sharing connection between the first terminal and the second terminal.

Optionally, the processor 601 is further configured to modify the prompt information, to obtain updated prompt information.

The transmitter 603 is configured to send the updated prompt information to the first terminal, so that the first terminal updates, by using the updated prompt information, the prompt information displayed on the scene image screen.

It may be learned from the foregoing content that, in this embodiment of the present application, a first terminal shares a scene image screen of a current scene of the first terminal with a second terminal, the first terminal receives prompt information sent by the second terminal, and the first terminal displays the prompt information on the scene image screen. The prompt information is used to indicate a position of a target point to be found by the first terminal or indicate a specific path to the target point, and the prompt information is determined by the second terminal according to the shared scene image screen and the target point. Because the first terminal shares the scene image screen of the current scene of the first terminal with the second terminal, a user of the first terminal can more accurately describe, by using the scene image screen, a scene in which the user is located, and the second terminal can more accurately determine the prompt information according to the shared scene image screen and received help request information. Further, because the first terminal displays the prompt information on the scene image screen, the user of the first terminal can more easily and accurately determine a meaning of the prompt information, and more quickly and conveniently find the target point according to the prompt information.

A person skilled in the art should understand that the embodiments of the present application may be provided as a method, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, or the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some examples of the embodiments of the present application have been described, a person skilled in the art can make changes and modifications to these embodiments once they learn the basic inventive concept. Therefore, the following claims are intended to be construed as to cover the examples of the embodiments and all changes and modifications falling within the scope of the present application.

Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A scene sharing-based navigation assistance method, comprising:
   sharing, by a first terminal, a scene image screen of a current scene of the first terminal with a second terminal, wherein a display screen sharing connection is established between the first terminal and the second terminal, wherein the scene image screen comprises a video screen obtained by a video call including a video shooting the current scene of the first terminal by a camera device connected to the first terminal, and wherein the video call is initiated between the first terminal and the second terminal;
   receiving, by the first terminal, prompt information sent by the second terminal; and
   displaying, by the first terminal on the display screen of the first terminal, the prompt information on the video screen, wherein the prompt information is used to indicate a position of a target point to be found by the first terminal or indicate a specific path to the target point, and wherein the prompt information is determined by the second terminal according to the shared scene image screen and the target point.

2. The method according to claim 1, before the receiving, by the first terminal, prompt information sent by the second terminal, further comprising:

sending, by the first terminal, help request information to the second terminal, wherein the help request information comprises information about the target point to be found by the first terminal.

3. The method according to claim 1, wherein the prompt information comprises at least one piece of the following information:
   mark information used to indicate the position of the target point or indicate the specific path to the target point;
   text information used to indicate the position of the target point or indicate the specific path to the target point; or
   audio information used to indicate the position of the target point or indicate the specific path to the target point.

4. The method according to claim 3, wherein when the prompt information is the mark information used to indicate the position of the target point or indicate the specific path to the target point, the method further comprises:
   receiving, by the first terminal, position information that is of the mark information on the scene image screen and sent by the second terminal; and
   wherein the displaying, by the first terminal, the prompt information on the scene image screen comprises:
   displaying, by the first terminal according to the received position information, the mark information in a corresponding position on the scene image screen displayed by the first terminal.

5. The method according to claim 4, after the displaying, by the first terminal according to the received position information, the mark information in a corresponding position on the scene image screen displayed by the first terminal, further comprising:
   obtaining, by the first terminal, first movement data of movement of the camera device connected to the first terminal;
   converting, by the first terminal, the first movement data into second movement data of movement of the mark information; and
   moving, by the first terminal according to the second movement data obtained after the conversion, the mark information displayed on the scene image screen, wherein the moved mark information matches a scene image screen shot by the moved camera device.

6. The method according to claim 5, wherein the obtaining, by the first terminal, first movement data of movement of the camera device connected to the first terminal comprises:
   obtaining, by the first terminal by using an acceleration sensor and a gyro sensor, the first movement data of the movement of the camera device connected to the first terminal.

7. The method according to claim 4, wherein the displaying, by the first terminal according to the received position information, the mark information in a corresponding position on the scene image screen displayed by the first terminal comprises:
   displaying, by the first terminal, the mark information in a corresponding position at a layer that is parallel to a display plane of the scene image screen.

8. The method according to claim 3, wherein the mark information is any one of or any combination of the following marks:
   curve mark information, straight line mark information, arrow line mark information, or closed graph mark information.

9. The method according to claim 1, wherein the display screen of the first terminal comprises a first area and a second area, and wherein displaying the prompt information on the video screen comprises displaying, in the first area, the prompt information on the video screen and displaying, in the second area, the prompt information on a GPS map screen that comprises a position of the current scene of the first terminal, the method further comprising:
   when the displayed video screen is touched, switching, by the first terminal, content displayed in the first area and content displayed in the second area.

10. The method according to claim 1, before the sharing, by a first terminal, a scene image screen of a current scene of the first terminal with a second terminal, further comprising:
    sending, by the first terminal, a help request to the second terminal; and
    receiving, by the first terminal, a help request acceptance response returned by the second terminal, wherein the help request acceptance response is used to establish a screen sharing connection between the first terminal and the second terminal.

11. The method according to claim 1, after the displaying, by the first terminal, the prompt information on the video screen, further comprising:
    receiving, by the first terminal, updated prompt information sent by the second terminal; and
    updating, by the first terminal by using the updated prompt information, the prompt information displayed on the video screen, wherein the updated prompt information is obtained by modifying the prompt information displayed on the video screen.

12. The method according to claim 1, wherein the display screen of the first terminal comprises a first area and a second area, and wherein displaying the prompt information on the video screen comprises displaying, in the first area, the prompt information on the video screen and displaying, in the second area, the prompt information on a GPS map screen that comprises a position of the current scene of the first terminal.

13. The method according to claim 12, wherein the display screen of the first terminal further comprises a third area, and wherein displaying the prompt information on the video screen further comprises:
    displaying, in the third area, an instant dialog box that is used to perform real-time dialog with the second terminal.

14. A scene sharing-based navigation assistance method, comprising:
    receiving, by a second terminal, a scene image screen that is shared by a first terminal and that is of a current scene of the first terminal, wherein a display screen sharing connection is established between the first terminal and the second terminal, wherein the scene image screen comprises a video screen obtained by a video call including a video shooting the current scene of the first terminal by a camera device connected to the first terminal, and wherein the video call is initiated between the first terminal and the second terminal;
    determining, by the second terminal according to the shared scene image screen, prompt information used to indicate a position of a target point or indicate a specific path to the target point; and
    sending, by the second terminal, the prompt information to the first terminal, wherein the first terminal displays, on the display screen of the first terminal, the prompt information on the video screen.

15. The method according to claim 14, before the determining, by the second terminal, prompt information used to indicate a position of a target point or indicate a specific path to the target point, further comprising:
receiving, by the second terminal, help request information sent by the first terminal, wherein the help request information comprises information about the target point to be found by the first terminal; and
wherein the determining, by the second terminal according to the shared scene image screen, prompt information used to indicate a position of a target point or indicate a specific path to the target point comprises:
determining, by the second terminal according to the shared scene image screen and the information about the target point in the help request information, the prompt information used to indicate the position of the target point or indicate the specific path to the target point.

16. The method according to claim 14, wherein the prompt information comprises at least one piece of the following information:
mark information used to indicate the position of the target point or indicate the specific path to the target point;
text information used to indicate the position of the target point or indicate the specific path to the target point; or
audio information used to indicate the position of the target point or indicate the specific path to the target point.

17. The method according to claim 16, wherein when the prompt information is the mark information used to indicate the position of the target point or indicate the specific path to the target point, the method further comprises:
sending, by the second terminal, position information of the mark information on the scene image screen to the first terminal, wherein
the position information is used to enable the first terminal to display, according to the received position information, the mark information in a corresponding position on the scene image screen displayed by the first terminal.

18. A scene sharing-based navigation assistance terminal comprising:
a transmitter;
a receiver;
a non-transitory memory configured to store an instruction; and
at least one processor configured to execute the instruction stored in the non-transitory memory, control the transmitter to send a signal, and control the receiver to receive a signal, wherein when the at least one processor executes the instruction stored in the non-transitory memory, the terminal is configured to:
share a scene image screen of a current scene of the terminal with a second terminal, wherein a display screen sharing connection is established between a first terminal and the second terminal, wherein the scene image screen comprises a video screen obtained by a video call including a video shooting the current scene of the terminal by a camera device connected to the terminal, and wherein the video call is initiated between the first terminal and the second terminal;
receive prompt information sent by the second terminal; and
display, on the display screen of the terminal, the prompt information on the video screen, wherein the prompt information is used to indicate a position of a target point to be found by the terminal or indicate a specific path to the target point, and wherein the prompt information is determined by the second terminal according to the shared scene image screen and the target point, wherein the display screen of the first terminal comprises a first area, a second area, and a third area simultaneously, and wherein displaying the prompt information on the display screen in at least one of the areas comprises:
displaying, in the first area, the prompt information on the video screen of the video call, wherein the video screen of the video call includes displaying the video shooting of the current scene of the first terminal,
displaying, in the second area, the prompt information on a GPS map screen that comprises a position of the current scene of the first terminal, and
displaying, in the third area, the prompt information in an instant text dialog box that is used to perform real-time text dialog with the second terminal, wherein the prompt information contains text information to be communicated mutually between the first terminal and the second terminal.

19. A scene sharing-based navigation assistance terminal comprising:
a transmitter;
a receiver;
a non-transitory memory configured to store an instruction; and
at least one processor configured to execute the instruction stored in the non-transitory memory, control the transmitter to send a signal, and control the receiver to receive a signal, wherein when the at least one processor executes the instruction stored in the non-transitory memory, the terminal is configured to:
receive a scene image screen that is shared by a first terminal and that is of a current scene of the first terminal, wherein a display screen sharing connection is established between the first terminal and a second terminal, wherein the scene image screen comprises a video screen obtained by a video call including a video shooting the current scene of the first terminal by a camera device connected to the first terminal, and wherein the video call is initiated between the first terminal and the second terminal;
determine, according to the shared scene image screen, prompt information used to indicate a position of a target point or indicate a specific path to the target point; and
send the prompt information to the first terminal, wherein the first terminal displays, on a display screen of the first terminal, the prompt information on the video screen, wherein the display screen of the first terminal comprises a first area, a second area, and a third area simultaneously, and wherein displaying the prompt information on the display screen in at least one of the areas comprises:
displaying, in the first area, the prompt information on the video screen of the video call, wherein the video screen of the video call includes displaying a video shooting continuously on the current scene of the first terminal,
displaying, in the second area, the prompt information on a GPS map screen that comprises a position of the current scene of the first terminal, and
displaying, in the third area, the prompt information in an instant text dialog box that is used to perform real-time text dialog with the second terminal, wherein the prompt information contains text information to be communicated mutually between the first terminal and the second terminal.

\* \* \* \* \*